(12) United States Patent
Secall

(10) Patent No.: US 9,955,519 B1
(45) Date of Patent: Apr. 24, 2018

(54) SYSTEMS AND METHODS FOR LICENSE-ENABLED SIGNAL PROCESSING

(71) Applicant: SONOVA AG, Staefa (CH)

(72) Inventor: Marc Secall, Constantine (CH)

(73) Assignee: Sonova AG, Staefa (CH)

( * ) Notice: Subject to any disclaimer, the term of this patent is extended or adjusted under 35 U.S.C. 154(b) by 0 days.

(21) Appl. No.: 15/582,415

(22) Filed: Apr. 28, 2017

(51) Int. Cl.
| H04B 7/00 | (2006.01) |
| H04W 76/02 | (2009.01) |
| H04B 1/3827 | (2015.01) |
| H04B 17/318 | (2015.01) |
| H04R 25/00 | (2006.01) |

(52) U.S. Cl.
CPC .......... H04W 76/023 (2013.01); H04B 1/385 (2013.01); H04B 17/318 (2015.01); H04R 25/554 (2013.01); *H04B 2001/3866* (2013.01); *H04R 2225/31* (2013.01); *H04R 2225/61* (2013.01)

(58) Field of Classification Search
CPC ... H04W 76/023; H04B 17/318; H04B 1/385; H04R 25/554
USPC ........................................................ 455/41.3
See application file for complete search history.

(56) References Cited

U.S. PATENT DOCUMENTS

| 2002/0129151 A1* | 9/2002 | Yuen ........................ H04S 3/002 709/229 |
| 2009/0096573 A1 | 4/2009 | Graessley |
| 2010/0211945 A1* | 8/2010 | Doui ..................... G06F 21/105 717/176 |
| 2011/0246978 A1 | 10/2011 | Alfano et al. |
| 2014/0079015 A1* | 3/2014 | Kim ....................... H04W 28/26 370/329 |
| 2014/0126010 A1 | 5/2014 | Rocas |

FOREIGN PATENT DOCUMENTS

| KR | 2007/010720 | 11/2007 |
| WO | WO-2004/054217 | 6/2004 |
| WO | WO-2009/125396 | 10/2009 |
| WO | WO-2014/088870 | 6/2014 |
| WO | WO-2015/030783 | 3/2015 |

\* cited by examiner

*Primary Examiner* — Eugene Yun

(57) ABSTRACT

A communication system maintains a signal processing license within a memory of the communication system. The signal processing license allows the communication system to perform a license-enabled signal processing function on signals received from one or more devices external to the communication system while the signal processing license is maintained within the memory. As such, the communication system detects that an additional communication system is within a transfer range of the communication system, and, in response, performs a transfer operation in which the signal processing license is transferred from the communication system to the additional communication system such that the signal processing license is no longer maintained within the memory once the transfer operation is completely performed. Consequently, subsequent to the transfer operation, the additional communication system is enabled to perform the license-enabled signal processing function while the communication system is prevented from performing the license-enabled signal processing function.

20 Claims, 11 Drawing Sheets

SYSTEMS AND METHODS FOR LICENSE-ENABLED SIGNAL PROCESSING

BACKGROUND INFORMATION

The natural sense of hearing in human beings involves the use of hair cells in the cochlea that convert or transduce acoustic signals into auditory nerve impulses. As such, hearing loss may generally be characterized as being one of two types: conductive and sensorineural. As described below, different types of hearing devices may be used to restore and/or improve hearing in patients based upon what type of hearing loss the patients suffer from.

Conductive hearing loss may occur when the normal mechanical pathways for sound to reach the hair cells in the cochlea are impeded. For example, these sound pathways may be impeded by damage to the auditory ossicles, resulting in an unwanted attenuation of sounds prior to reaching the hair cells in the cochlea. As such, conductive hearing loss may often be overcome through the use of hearing devices that amplify sounds to help acoustic signals reach the hair cells at easily perceivable levels. For example, various types of hearing aids that function in this way may be available to improve hearing for those with conductive hearing loss.

Sensorineural hearing loss, on the other hand, is caused by the absence or destruction of the hair cells in the cochlea, which are needed to properly transduce acoustic signals into auditory nerve impulses. Accordingly, while patients who suffer from certain degrees of sensorineural hearing loss (e.g., mild, moderate, and/or profound hearing loss) may derive at least some benefit from hearing aids, certain patients who suffer from more serious degrees of sensorineural hearing loss (e.g., profound or total hearing loss) may be unable to derive significant benefit from hearing aid systems, no matter how loud the acoustic stimulus. Thus, to overcome certain degrees of sensorineural hearing loss, hearing devices such as cochlear implant systems (also known as cochlear prostheses) have been developed to bypass the hair cells in the cochlea altogether by presenting electrical stimulation directly to the auditory nerve fibers by way of an array of electrodes implanted within the cochlea. By directly stimulating the auditory nerve fibers in this way, patients with sensorineural hearing loss may perceive sound and at least partial restoration of hearing function may be achieved.

Unfortunately, with any type of hearing loss from which a patient may suffer, and with any type of hearing device that the patient may use, it may be difficult, impractical, or impossible for the patient to clearly and adequately perceive certain sounds presented to the patient in certain situations. For example, as a result of noise, reverberation, and the like, the signal-to-noise ratio in a relatively large and/or crowded room (e.g., a classroom, a theater, a conference room, a restaurant, a convert venue, etc.) may cause significant difficulty for the patient in trying to understand what one or more speakers (e.g., instructors, presenters, performers, etc.) in the room are saying. In some situations, a device (e.g., a microphone or the like) may be used to capture sound made by the speaker (e.g., the speaker's voice, etc.) near the source in order to amplify the sound and/or transmit a signal (e.g., a wireless signal) representative of the sound for the benefit of various people listening (e.g., everyone in the room, those in the room who suffer from hearing loss, people listening in a separate location to which the sound is being broadcast, etc.). However, conventional systems and methods by which various types of hearing devices receive, process, and present such signals to patients may be outdated, inflexible, and otherwise in need of improvement so as not to stifle improvements that could be made and/or are being made to new generations of hearing devices.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION

Figure 1:
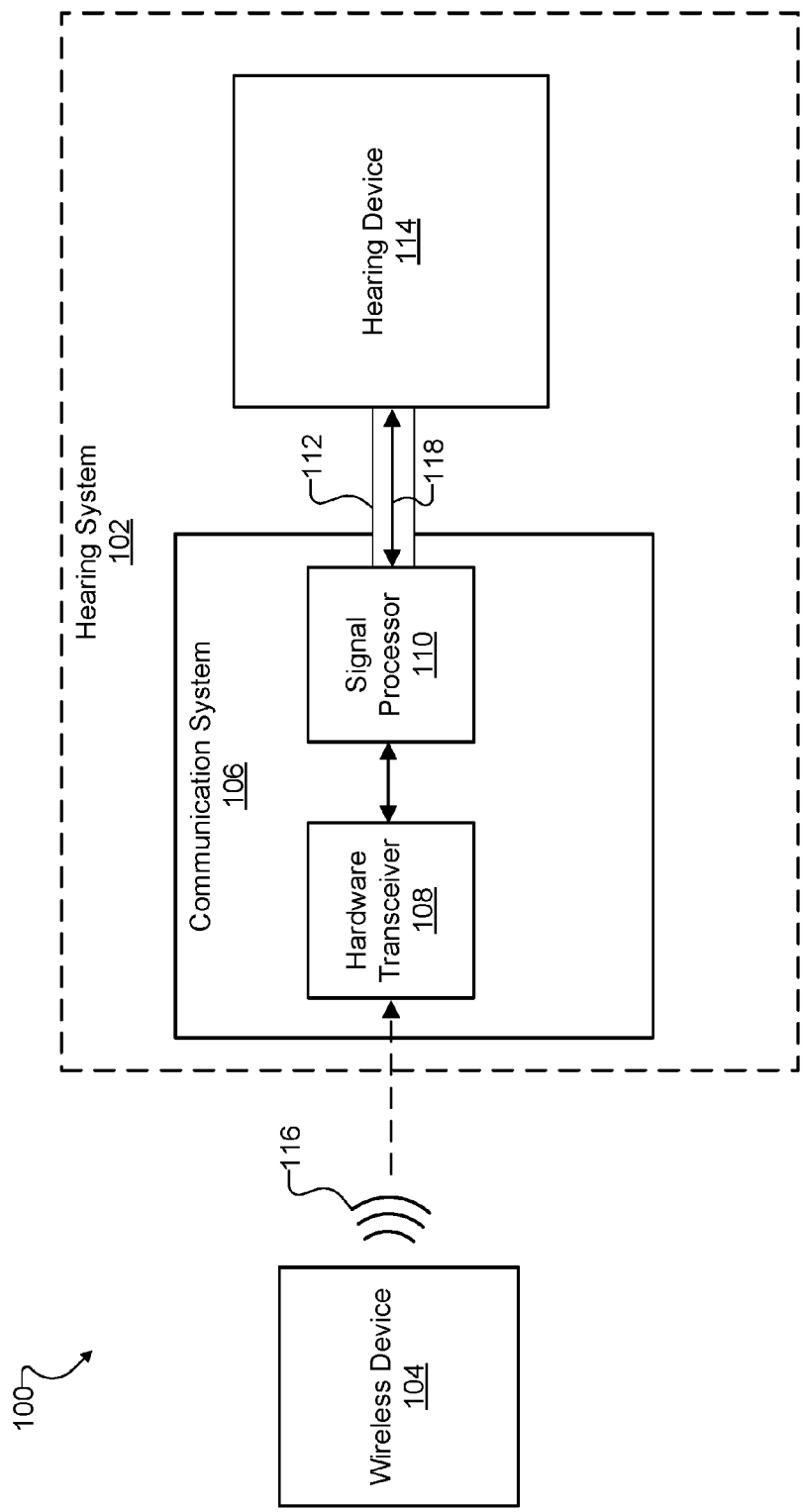
FIG. 1 illustrates an exemplary configuration in which an exemplary hearing system receives and processes signals from one or more devices external to the hearing system according to principles described herein.

Systems and methods for license-enabled signal processing of signals (e.g., wireless signals, electrical signals, optical signals, etc.) are described herein. For example, a communication system that includes one or more physical computing devices (e.g., a processor, a memory, a communication interface, etc.) may maintain a signal processing license within a memory of the communication system. The signal processing license may be implemented, for example, by data representative of a key, a token, or the like, that may be stored and/or otherwise maintained in the memory of the communication system. While the signal processing license is maintained by the communication system, the signal processing license may be configured to allow the communication system to perform a license-enabled signal processing function on signals (e.g., wireless signals) received by the communication system from one or more devices external to the communication system.

As used herein, a "signal processing function" may be performed on or with respect to a signal (e.g., a wireless signal, an electrical signal, an optical signal, etc.) to receive, process, and/or provide the signal for use by a communication system, a hearing device, or another device or system as may serve a particular implementation. For example, in the case of a wireless signal, performing a signal processing function on a wireless signal may include receiving the wireless signal (e.g., by way of a radio or other hardware transceiver), demodulating the wireless signal, performing an analog-to-digital conversion on the demodulated signal, converting the signal into another form (e.g., into an electrical or optical audio signal, a magnetic signal, an acoustic signal, etc.), providing (e.g., sending, transmitting, etc.) the processed signal to a hearing device or the like, and/or any other operations as may serve to facilitate preparation and use of a signal in a communication system, a hearing system, or the like. Accordingly, a "license-enabled signal processing function" may refer to any signal processing function that requires or uses a license (e.g., a signal processing license) to enable, allow, or facilitate performance of the signal processing function. Examples of signal processing functions, including license-enabled signal processing functions, will be described in more detail below. While many examples included herein are described specifically in terms of wireless signals, it will be understood that the principles illustrated by these examples may also be applicable to other types of signals such as electrical signals, optical signals, and the like.

Returning to the exemplary communication system described above, the wireless signals received by the communication system from the one or more devices external to the communication system may include signals representative of audio (e.g., digital, packet-based audio transmissions, frequency modulated ("FM") audio transmissions, etc.) from one or more devices that transmit or broadcast such audio signals (e.g., a wireless microphone that detects an acoustic signal and transmits the audio transmissions based on the acoustic signal). In some examples, while the signal processing license is maintained within the memory of the communication system, the communication system may detect that an additional communication system is within a transfer range (e.g., is already located within a predetermined proximity, enters within a predetermined proximity, etc.) of the communication system.

In response to the detection that the additional communication system is within the transfer range (e.g., or enters into the transfer range) of the communication system, the communication system may perform a transfer operation with respect to the signal processing license. For example, the communication system may cause the signal processing license to be transferred from the communication system to the additional communication system such that the signal processing license is no longer maintained within the memory of the communication system once the transfer operation is completely performed. Instead, for example, the signal processing license may be maintained within a memory of the additional communication system once the transfer operation is completely performed. As such, the transfer operation may allow the additional communication system to perform the license-enabled signal processing function subsequent to the transfer operation. The transfer operation may likewise prevent the communication system from being able to perform the license-enabled signal processing function subsequent to the transfer operation.

In other words, the signal processing license may only be used by one of the communication system and the additional communication system at a time to perform the license-enabled signal processing function. Although both communication systems may include the necessary hardware and/or software to perform the license-enabled signal processing function (e.g., to receive, process, and provide the wireless signals for use by the communication system such as to facilitate hearing of a user of a hearing device), only the communication system currently maintaining the signal processing license may be allowed or enabled to perform the license-enabled signal processing function at any given time. The other communication system not maintaining the signal processing license may be disabled from performing the license-enabled signal processing function with respect to the wireless signals.

The communication system and the additional communication system may be implemented as any types of systems described herein or as may serve a particular implementation. For instance, as will be further described and illustrated below, the communication system and the additional communication system may be similar or identical systems in certain examples, while, in other examples, the communication system and the additional communication system may have significant differences. For example, if the communication system and the additional communication system relate to hearing systems and the wireless signals include a digital (e.g., packet-based) audio transmission, exactly one of the communication system and the additional communication system may be configured to provide stimulation to a user to facilitate the user in perceiving the acoustic signal upon which the digital audio transmission is based. In other words, exactly one of the communication system and the additional communication system may include (e.g., be implemented within, associated with, etc.) a hearing device such as a hearing aid, a sound processor associated with a cochlear implant, or the like.

In contrast, the other communication system (i.e., the one not implemented by the hearing device) may be configured to enable one or more hearing devices, but not to act as a hearing device itself. For example, the other communication system not implemented by the hearing device may be implemented by a hearing device plug-in accessory associated with a power pack system, or by a hearing device streamer accessory. Various examples of communication systems (including standalone communication systems and communication systems integrated within hearing systems) will be described in more detail below.

The systems and methods for license-enabled signal processing of wireless signals described herein may provide various benefits. For example, the systems and methods for license-enabled signal processing of wireless signals described herein may allow for and facilitate innovation of communication systems. More specifically, as will be described in more detail below, the systems and methods for license-enabled signal processing of wireless signals described herein may allow use patterns, paradigms, reimbursement schemes, and so forth, that have been established with conventional communication systems to remain intact even while allowing new technologies to be more practically and conveniently leveraged and rolled out for new generations of hearing systems, hearing devices, and/or communication systems. Such technologies may provide usability benefits to end users, flexibility for institutional customers, and other benefits as will be made apparent in the description below.

Various embodiments will now be described in more detail with reference to the figures. The disclosed systems and methods may provide one or more of the benefits mentioned above and/or various additional and/or alternative benefits that will be made apparent herein.

FIG. 1 illustrates an exemplary configuration 100 in which an exemplary hearing system receives and processes wireless signals from one or more devices external to the hearing system. While the context of many examples described and illustrated herein relate to hearing systems (e.g., hearing aid systems, cochlear implant systems, etc.), it will be understood that such systems are used for illustrative purposes only. In various examples, the principles underlying the specific hearing system examples described herein may be applied to numerous other types of systems (i.e., systems unrelated to facilitating hearing by those suffering from hearing loss). As such, the principles described below in relation to hearing systems should be interpreted to broadly apply to any type of system as may serve a particular implementation.

Configuration 100 illustrates a hearing system 102 and a wireless device 104 that is external to (i.e., separate from hearing system 102). For example, hearing system 102 may include a hearing aid system, a cochlear implant system, or the like, and wireless device 104 may be a device that generates and transmits wireless signals (e.g., a wireless microphone transmitting digital (e.g., packet-based) audio transmissions).

As shown, hearing system 102 includes an exemplary communication system 106 that includes a hardware transceiver 108 communicatively coupled with a signal processor 110. For example, if hearing system 102 is a hearing aid system, communication system 106 may be a hearing device plug-in accessory (e.g., configured to plug into a hearing device by way of a universal Europlug interface, a proprietary interface, etc.), a hearing device streamer accessory (e.g., configured to be worn around the neck of the user and to communicate with a hearing device by way of a wireless audio interface such as a universal telecoil interface or the like), or another suitable accessory configured to couple with a hearing device as may serve a particular implementation. Accordingly, hardware transceiver 108 within communication system 106 may include and/or be implemented by an antenna and/or any other suitable circuitry and components as may be used to receive wireless signals from wireless device 104 in a particular implementation.

Signal processor 110 within communication system 106 may include and/or be implemented by at least one physical computing component such as a processor, a memory, digital logic, or other computing components capable of performing a signal processing function on a signal received from hardware transceiver 108. For instance, the signal processing function may be as simple as passing the signal received from hardware transceiver 108 forward to the hearing device, or may include any signal processing (e.g., converting, amplifying, splitting, filtering, or otherwise modifying or improving the signal) as may serve a particular implementation.

To this end, as further shown in configuration 100, communication system 106 may be coupled, by way of a connection 112, with a hearing device 114. Hearing device 114 may include a hearing aid, a sound processor or other component of a cochlear implant system, or another type of hearing device as may serve a particular implementation of hearing system 102. Accordingly, as described above, connection 112 may communicatively and/or physically couple communication system 106 with hearing device 114 in any way that serves both communication system 106 and hearing device 114. For example, if hearing device 114 is a hearing aid and communication system 106 is a hearing device plug-in accessory, connection 112 may be a wired, plug-in interface (e.g., a universal Europlug interface, a proprietary interface, etc.) that both physically and communicatively couples communication system 106 with hearing device 114. Conversely, if communication system 106 is a hearing device streamer accessory, connection 112 may be a wireless audio interface (e.g., a universal telecoil interface, another audio induction interface, another radio interface, etc.) that communicatively (but wirelessly, rather than physically) couples communication system 106 with hearing device 114.

Accordingly, configuration 100 illustrates that wireless device 104 may transmit exemplary wireless signals 116 to hearing system 102. As illustrated, wireless signals 116 may be received at hearing system 102 by hardware transceiver 108 (e.g., within communication system 106) and communicated to signal processor 110, where a signal processing function may be performed before providing a signal 118 representative of the data received and processed from wireless signals 116 to hearing device 114 by way of connection 112.

FIGS. 2, 3, 4, and 6 illustrate various exemplary implementations of configuration 100 in which various types of hearing systems receive and process wireless signals from one or more devices external to the hearing systems. (FIG. 5 does not illustrate an implementation of configuration 100, but rather shows a schematic structure of the human cochlea to facilitate understanding of how the configuration described in FIG. 4 functions.) In other words, FIGS. 2, 3, 4, and 6 each show respective configurations that implement and/or are otherwise analogous to configuration 100, discussed above in relation to FIG. 1. As such, in FIGS. 2, 3, 4, and 6, as well as in other figures that will be described below (i.e., FIGS. 9 and 10), a consistent numbering scheme (i.e., a numbering scheme based on the reference designation numbers of FIG. 1) will be used to illustrate analogous components. At the same time, because the components in each figure may not be identical to analogous components in other figures, the numbering scheme allows the reference designation number for each component to be unique.

Specifically, for example, the reference designation number of hearing system 102 (i.e., "102") includes a '1' to indicate that it is associated with FIG. 1 (and configuration 100), and includes an '02' to indicate what type of component it is (i.e., some type of hearing system; in this case, a generic hearing system). Accordingly, reference designation numbers "202" (in FIG. 2), "302" (in FIG. 3), and so forth, indicate similar types of components for each respective configuration illustrated in the respective figures (e.g., hearing systems that perform similar or analogous functions, but which may be less generic and more specific to a particular implementation).

Figure 2:
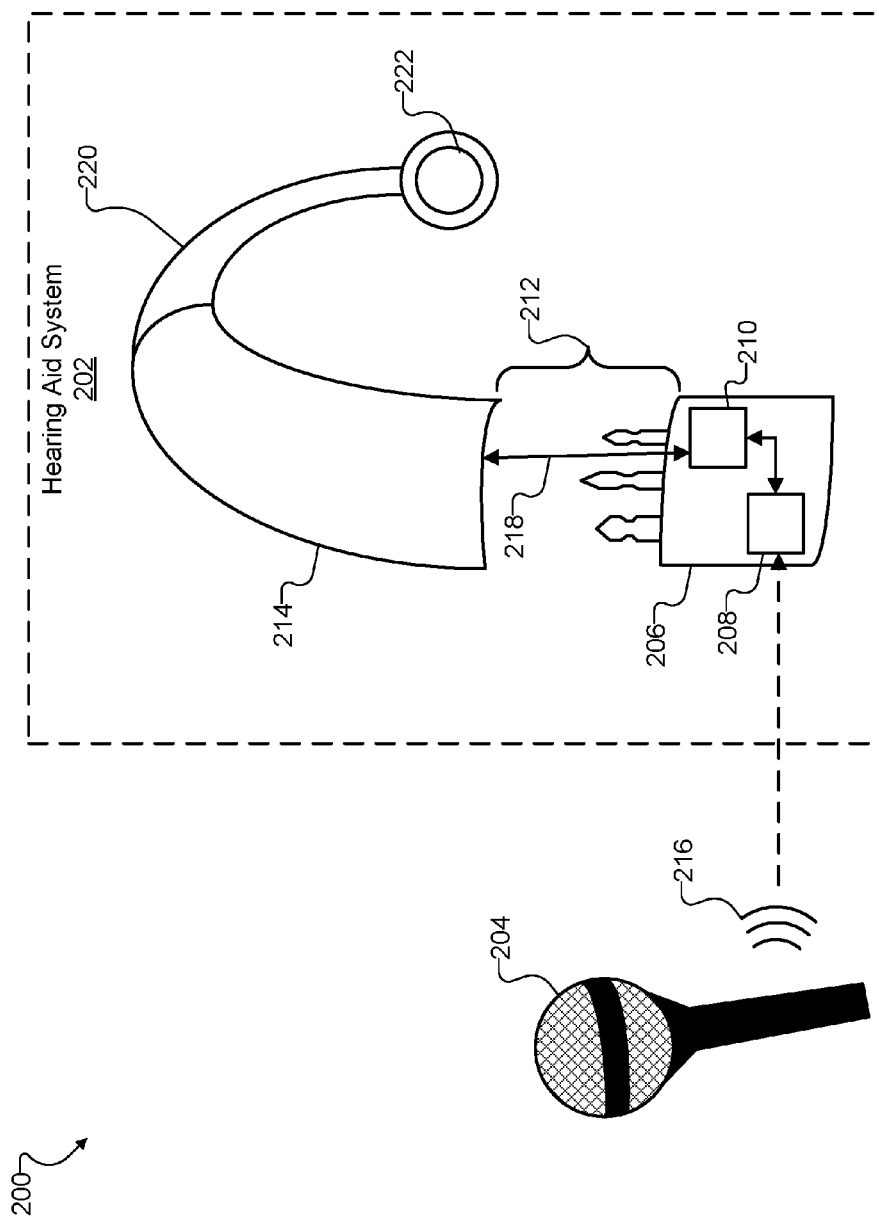
FIGS. 2-4 illustrate exemplary implementations of the configuration of FIG. 1 in which various types of hearing systems receive and process signals from one or more devices external to the hearing systems according to principles described herein.

To illustrate, FIG. 2 shows a configuration 200, which is analogous to (e.g., but may be more specific than) configuration 100 of FIG. 1. Specifically, configuration 200 includes a hearing aid system 202 (i.e., a particular type of hearing system analogous to hearing system 102) that receives wireless signals from a wireless microphone 204 that is an exemplary implementation of wireless device 104 of FIG. 1. Configuration 200 also includes a hearing device plug-in accessory 206 that implements communication system 106 and that includes an wireless receiver 208 (e.g., a digital receiver, and FM receiver, etc.) implementing hardware transceiver 108 and a signal processor 210 implementing signal processor 110. A plug-in interface 212 (e.g., a universal Europlug interface) implements connection 112 described above to allow hearing device plug-in accessory 206 to physically couple (i.e., plug in) and communicatively couple with a hearing aid 214 that implements hearing device 114.

In operation (e.g., when hearing device plug-in accessory 206 is coupled with hearing aid 214, not explicitly shown in FIG. 2), wireless microphone 204 may transmit a digital (e.g., packet-based) audio transmission 216 that implements wireless signals 116. Wireless receiver 208 detects and/or receives digital audio transmission 216 and provides a signal representative of digital audio transmission 216 to signal processor 210 for signal processing. For example, voice audio included within the signal may be processed and/or amplified by way of one or more signal processing functions performed by signal processor 210 to make the signal easier for hearing aid 214 to present and/or for a user using hearing aid 214 to hear and understand. An electrical audio signal 218 representative of the audio included within digital audio transmission 216 may be transmitted by signal processor 210 to hearing aid 214 to be presented to a user wearing hearing aid 214. Additionally or alternatively, audio signal 218 may be representative of audio included within digital audio transmission 216, but may not yet be processed (or fully processed) until after being transmitted to hearing aid 214. For example, signal processor 210 or another analogous signal processor may be included within hearing aid 214 such that at least part of the signal processing function is performed on hearing aid 214, rather than on hearing device plug-in accessory 206.

While the components of configuration 200 described above are each associated with an analogous component described above with respect to configuration 100, configuration 200 also illustrates additional components that do not directly correlate with components shown in configuration 100 of FIG. 1. Specifically, as shown, hearing aid 214 is connected to an ear hook 220 that may facilitate a user of hearing aid 214 in wearing hearing aid 214 behind the ear. Ear hook 220 also includes an earpiece 222, which may fit within the user's ear while the hearing aid is being worn to present acoustic stimulation to the user.

Figure 3:
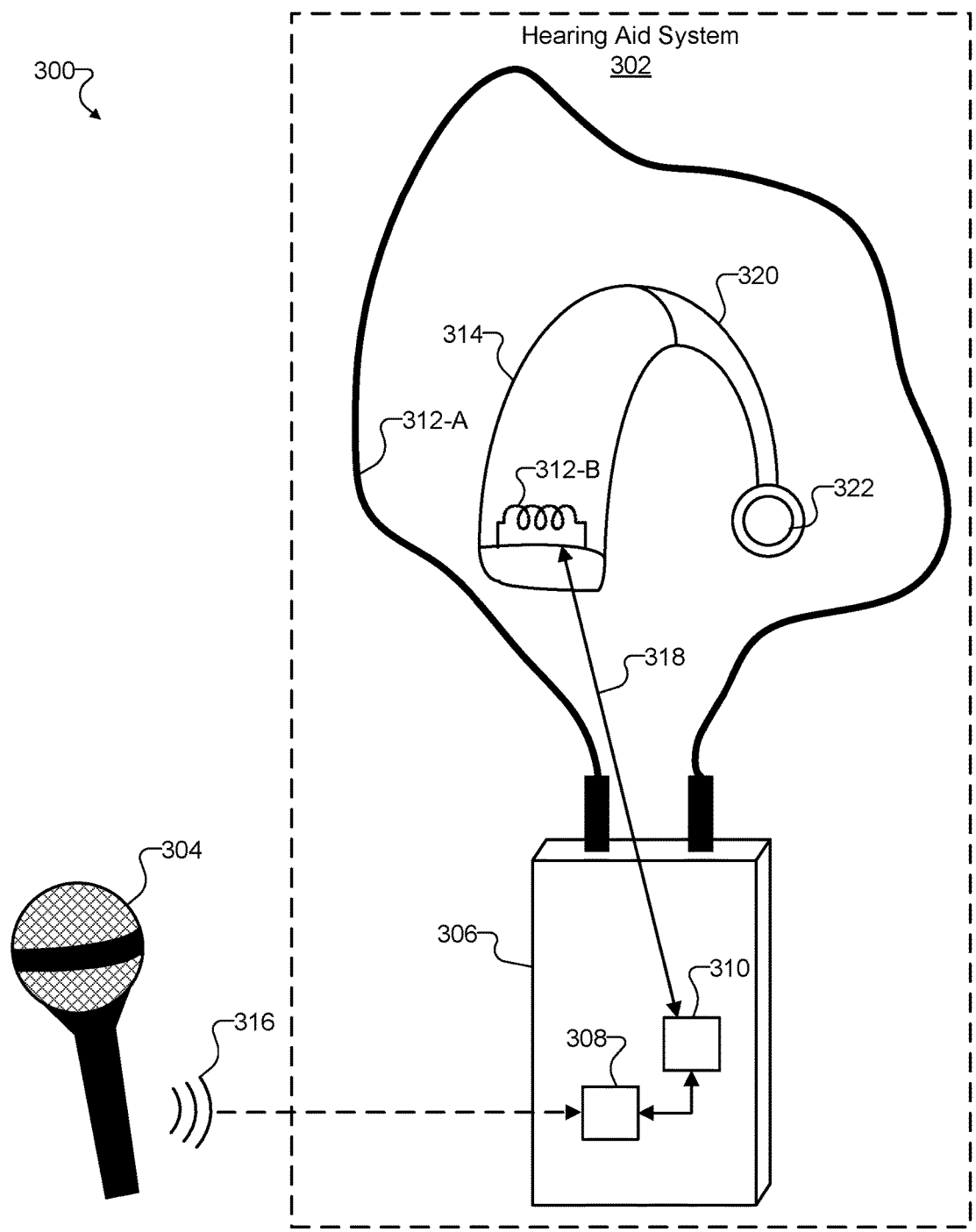

As another example, FIG. 3 shows a configuration 300, which, like configuration 200, is analogous to (e.g., but may be more specific than) configuration 100 of FIG. 1. Specifically, configuration 300 includes a hearing aid system 302 that receives wireless signals from a wireless microphone 304 similar to wireless microphone 204. In place of hearing device plug-in accessory 206 of FIG. 2, however, configuration 300 includes a hearing device streamer accessory 306 to implement communication system 106. Similar to hearing device plug-in accessory 206, hearing device streamer accessory 306 includes a wireless receiver 308 implementing hardware transceiver 108 and a signal processor 310 implementing signal processor 110. However, in place of plug-in interface 212 of configuration 200, a wireless audio interface 312 implements connection 112 described above to allow hearing device streamer accessory 306 to communicatively couple with a hearing aid 314 that implements hearing device 114. In some examples, wireless audio interface 312 could be implemented as a simple induction interface. For instance, wireless audio interface 312 may generate a signal (e.g., a radio signal, a magnetic signal, etc.) using a transmit antenna 312-A (e.g., implemented by a neckloop or the like), and the signal may be detected by a receive antenna 312-B (e.g., implemented by a universal telecoil or another suitable coil or the like). In other examples, wireless audio interface 312 may be implemented as a more complex near field communication interface (e.g., that transmits digitally modulated audio or the like). In certain implementations, wireless audio interface 312 may represent other suitable types of wireless audio interfaces. For instance, wireless audio interface 312 may be implemented by a wireless interface that may or may not include an induction loop, and that may include a radio interface that uses one or more electromagnetic antennas configured to communicate in the far field to transmit a digital audio signal using phase modulation, amplitude modulation, frequency modulation, or any combination thereof (e.g., Gaussian frequency shift keying ("GFSK"), M-ary phase shift keying ("MPSK"), quadrature amplitude modulation ("QAM"), orthogonal frequency-division multiplexing ("OFDM"), etc.). As shown, while hearing aid 314 may perform similar functionality as hearing aid 214 of FIG. 2, hearing aid 314 may provide wireless audio interface 312 (e.g., by including receive antenna 312-B and associated circuitry) in addition or as an alternative to a plug-in interface such as plug-in interface 212.

In operation, wireless microphone 304 may transmit a digital audio transmission 316 that implements wireless signals 116 (e.g., and is the same or similar to digital audio transmission 216). Wireless receiver 308 may then detect and/or receive digital audio transmission 316 and may provide a signal representative of digital audio transmission 316 to signal processor 310 for signal processing analogous to the signal processing described above. A radio signal 318 representative of the audio included within digital audio transmission 316 may be transmitted by way of wireless audio interface 312 (i.e., by generating radio signal 318 via transmit antenna 312-A) to be received by (i.e., by receive antenna 312-B) within hearing aid 314 and presented to a user wearing hearing aid 314. Additionally or alternatively, radio signal 318 may be representative of audio included within digital audio transmission 316, but may not yet be processed (or fully processed) until after being transmitted to hearing aid 314. For example, signal processor 310 or another analogous signal processor may be included within hearing aid 314 such that at least part of the signal processing function is performed on hearing aid 314, rather than on hearing device streamer accessory 306.

As shown, hearing aid 314 may also be connected to an ear hook 320 that, analogously with ear hook 220, may facilitate a user of hearing aid 314 in wearing hearing aid 314 behind the ear. Ear hook 320 also includes an earpiece 322 analogous to earpiece 222, described above, to present acoustic stimulation to the user while the user wears the hearing aid.

Figure 4:
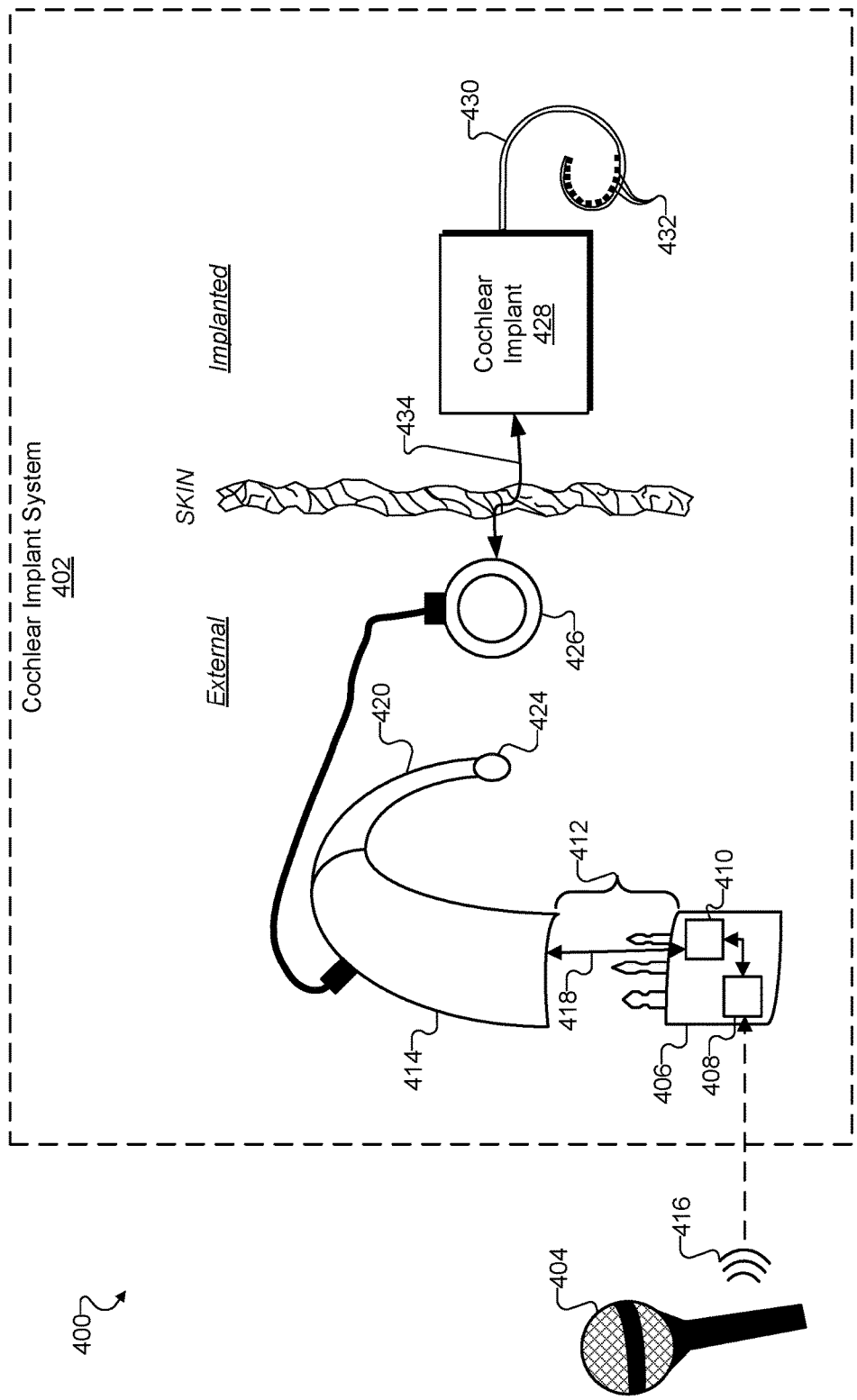

As another example, FIG. 4 shows a configuration 400, which, like configurations 200 and 300, is analogous to (e.g., but may be more specific than) configuration 100 of FIG. 1. Specifically, configuration 400 includes a cochlear implant system 402 (i.e., another particular type of hearing system analogous to hearing system 102) that receives wireless signals from a wireless microphone 404 similar to wireless microphones 204 and 304. Similar to hearing device plug-in accessory 206 of FIG. 2, configuration 400 includes a hearing device plug-in accessory 406. However, it will be understood that, in certain implementations, cochlear implant systems such as hearing system 402 may additionally or alternatively use a hearing device streamer accessory such as hearing device streamer accessory 306 or another suitable accessory to implement communication system 106. Similar to hearing device plug-in accessory 206, hearing device plug-in accessory 406 includes an wireless receiver 408 implementing hardware transceiver 108, a signal processor 410 implementing signal processor 110, and a plug-in interface 412 implementing connection 112. However, in place of a hearing aid such as hearing aids 214 and 314 of configurations 200 and 300, respectively, configuration 400 includes a sound processor 414 of cochlear implant system 402 to implement hearing device 114.

In operation, wireless microphone 404 may transmit a digital audio transmission 416 that implements wireless signals 116 (e.g., and is the same or similar to digital audio transmissions 216 and 316). Wireless receiver 408 may then detect and/or receive digital audio transmission 416 and may provide a signal representative of digital audio transmission 416 to signal processor 410 for signal processing analogous to the signal processing described above (e.g., performing the signal processing functions described above). An electrical audio signal 418 representative of the audio included within digital audio transmission 416 may be transmitted by way of plug-in interface 412 to sound processor 414 to be presented to a user using cochlear implant system 402. Additionally or alternatively, audio signal 418 may be representative of audio included within digital audio transmission 416, but may not yet be processed (or fully processed) until after being transmitted to sound processor 414. For example, signal processor 410 or another analogous signal processor may be included within sound processor 414 such that at least part of the signal processing function is performed on sound processor 414, rather than on hearing device plug-in accessory 406.

As shown, sound processor 414 may also be connected to an ear hook 420 that, analogously with ear hooks 220 and 320, may facilitate a user of sound processor 414 in wearing sound processor 414 behind the ear. However, rather than applying acoustic stimulation by way of an earpiece (e.g., such as earpieces 222 and 322 of configurations 200 and 300, respectively), cochlear implant system 402 may apply stimulation representative of digital audio transmission 416 by other means and using additional components that may have no analog in hearing aid systems 202 and 302.

Specifically, as shown in FIG. 4, cochlear implant system 402 may include various components configured to be located external to a user (e.g., a cochlear implant patient) including, but not limited to, a microphone 424, sound processor 414, ear hook 420, and a headpiece 426. Cochlear implant system 402 may further include various components configured to be implanted within the user including, but not limited to, a cochlear implant 428 (also referred to as an implantable cochlear stimulator) and a lead 430 (also referred to as an intracochlear electrode array) with a plurality of electrodes 432 disposed thereon. In certain examples, additional or alternative components may be included within cochlear implant system 402 as may serve a particular implementation. Additionally, it will be understood that in certain implementations (e.g., "fully-implantable" implementations), one or more of the components described and illustrated as being external to the user may alternatively be implanted within the user. These components specific to cochlear implant system 402 will now be described in more detail.

Microphone 424 may be configured to detect audio signals presented to the patient. Microphone 424 may be implemented in any suitable manner. Microphone 424 may be associated with a particular ear of the patient such as by being located in a vicinity of the particular ear (e.g., within the concha of the ear near the entrance to the ear canal). As shown, in some examples, microphone 424 may be held within the concha of the ear near the entrance of the ear canal by a boom or stalk that is associated with (e.g., attached to) ear hook 420 and configured to be selectively attached to sound processor 414. Additionally or alternatively, microphone 424 may be implemented by one or more microphones disposed within headpiece 426, one or more microphones disposed within sound processor 414, one or more beam-forming microphones, and/or any other suitable microphone or microphones as may serve a particular implementation.

In addition to the functionality analogous to hearing aids 214 and 314 described above, sound processor 414 (i.e., at least one physical computing component included within sound processor 414) may be further configured to direct cochlear implant 428 to generate and apply electrical stimulation (also referred to herein as "stimulation current") representative of one or more audio signals (e.g., audio signal 418, one or more audio signals detected by microphone 424, etc.) to one or more stimulation sites associated with an auditory pathway (e.g., the auditory nerve) of the patient. Exemplary stimulation sites include, but are not limited to, one or more locations within the cochlea, the cochlear nucleus, the inferior colliculus, and/or any other nuclei in the auditory pathway. While, for the sake of simplicity, electrical stimulation will be described herein as being applied to one or both of the cochleae of a patient, it will be understood that stimulation current may also be applied to other suitable nuclei in the auditory pathway. To this end, sound processor 414 may process the one or more audio signals in accordance with a selected sound processing strategy or program (i.e., a selected sound processing program) to generate appropriate stimulation parameters for controlling cochlear implant 428. As shown, sound processor 414 may include or be implemented by a behind-the-ear ("BTE") unit. In other examples, however, it will be understood that sound processor 414 may be implemented by a body worn device, and/or any other sound processing unit as may serve a particular implementation. For example, sound processor 414 may be implemented by an electro-acoustic stimulation ("EAS") sound processor included in an EAS system configured to provide electrical and acoustic stimulation to a patient.

In certain implementations, sound processor 414 may wirelessly transmit stimulation parameters (e.g., in the form of data words included in a forward telemetry sequence) and/or power signals to cochlear implant 428 by way of a wireless communication link 434 between headpiece 426 and cochlear implant 428. It will be understood that communication link 434 may include a bidirectional communication link and/or one or more dedicated unidirectional communication links. In some examples, sound processor 414 may execute and operate in accordance with a sound processing program that has been loaded onto sound processor 414.

Headpiece 426 may be communicatively coupled to sound processor 414 (e.g., by a wired connection) and may include an external antenna (e.g., a coil and/or one or more wireless communication components) configured to facilitate selective wireless coupling of sound processor 414 to cochlear implant 428. Headpiece 426 may additionally or alternatively be used to selectively and wirelessly couple any other external device to cochlear implant 428. To this end, headpiece 426 may be configured to be affixed to the patient's head and positioned such that the external antenna housed within headpiece 426 is communicatively coupled to a corresponding implantable antenna (which may also be implemented by a coil and/or one or more wireless communication components) included within or otherwise associated with cochlear implant 428. In this manner, stimulation parameters and/or power signals may be wirelessly transmitted between sound processor 414 and cochlear implant 428 via communication link 434.

Cochlear implant 428 may include any type of implantable stimulator that may be used in association with the systems and methods described herein. For example, cochlear implant 428 may be implemented by an implantable cochlear stimulator. In some alternative implementations, cochlear implant 428 may include a brainstem implant and/or any other type of active implant or auditory prosthesis that may be implanted within a patient and configured to apply stimulation to one or more stimulation sites located along an auditory pathway of a patient.

In some examples, cochlear implant 428 may be configured to generate and apply electrical stimulation representative of an audio signal processed by sound processor 414 (e.g., audio signal 418, an audio signal detected by microphone 424, etc.) in accordance with one or more stimulation parameters transmitted thereto by sound processor 414. Cochlear implant 428 may be further configured to apply the electrical stimulation to one or more stimulation sites within the patient via one or more electrodes 432 disposed along lead 430 (e.g., by way of one or more stimulation channels formed by electrodes 432). In some examples, cochlear implant 428 may include a plurality of independent current sources each associated with a channel defined by one or more of electrodes 432. In this manner, different stimulation current levels may be applied to multiple stimulation sites simultaneously (also referred to as "concurrently") by way of multiple electrodes 432.

Figure 5:
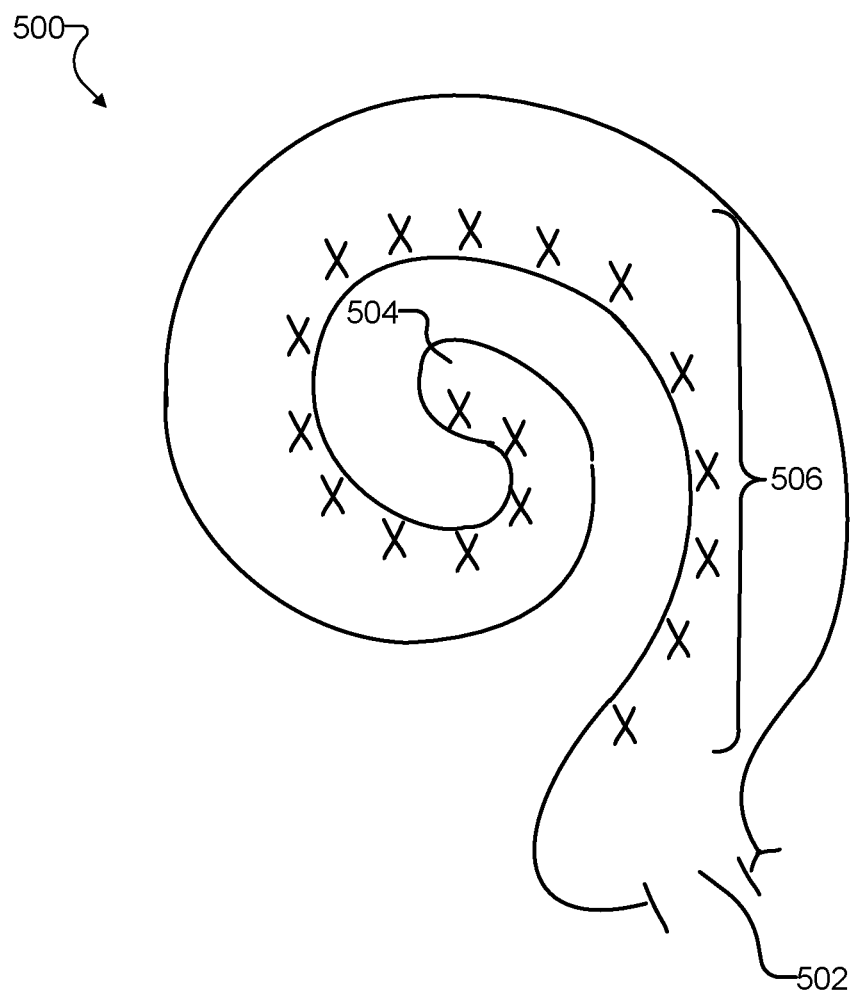
FIG. 5 illustrates a schematic structure of the human cochlea to facilitate understanding of how the exemplary hearing system of FIG. 4 functions according to principles described herein.

In order to facilitate understanding of how cochlear implant system 402 functions to facilitate hearing by the user, FIG. 5 illustrates a schematic structure of a human cochlea 500 into which lead 430 may be inserted. As shown in FIG. 5, cochlea 500 is in the shape of a spiral beginning at a base 502 and ending at an apex 504. Within cochlea 500 resides auditory nerve tissue 506, which is denoted by Xs in FIG. 5. Auditory nerve tissue 506 is organized within cochlea 500 in a tonotopic manner. That is, relatively low frequencies are encoded at or near apex 504 of cochlea 500 (referred to as an "apical region") while relatively high frequencies are encoded at or near base 502 (referred to as a "basal region"). Hence, each location along the length of cochlea 500 corresponds to a different perceived frequency. Cochlear implant system 402 may therefore be configured to apply electrical stimulation to different locations within cochlea 500 (e.g., different locations along auditory nerve tissue 506) to provide a sensation of hearing to the user. For example, when lead 430 is properly inserted into cochlea 500, each of electrodes 432 may be located at a different cochlear depth within cochlea 500 (e.g., at a different part of auditory nerve tissue 506) such that stimulation current applied to one electrode 432 may cause the patient to perceive a different frequency than the same stimulation current applied to a different electrode 432 (e.g., an electrode 432 located at a different part of auditory nerve tissue 506 within cochlea 500).

In the exemplary configurations described and illustrated above (i.e., configurations 100, 200, 300, and 400), each hearing system includes a communication system that is separate from (although configured to communicatively couple with) a hearing device included within the hearing system. Specifically, communication system 106 and hearing device 114 in configuration 100, hearing device plug-in accessory 206 and hearing aid 214 in configuration 200, hearing device streamer accessory 306 and hearing aid 314 in configuration 300, and hearing device plug-in accessory 406 and sound processor 414 in configuration 400 have each been illustrated and described as being distinct devices that may be coupled (e.g., communicatively and, in certain cases physically) with one another. In contrast with the above configurations, however, certain hearing systems (e.g., newer generations of hearing systems) may include a hearing device that includes a communication system integrated with the hearing device.

Figure 6:
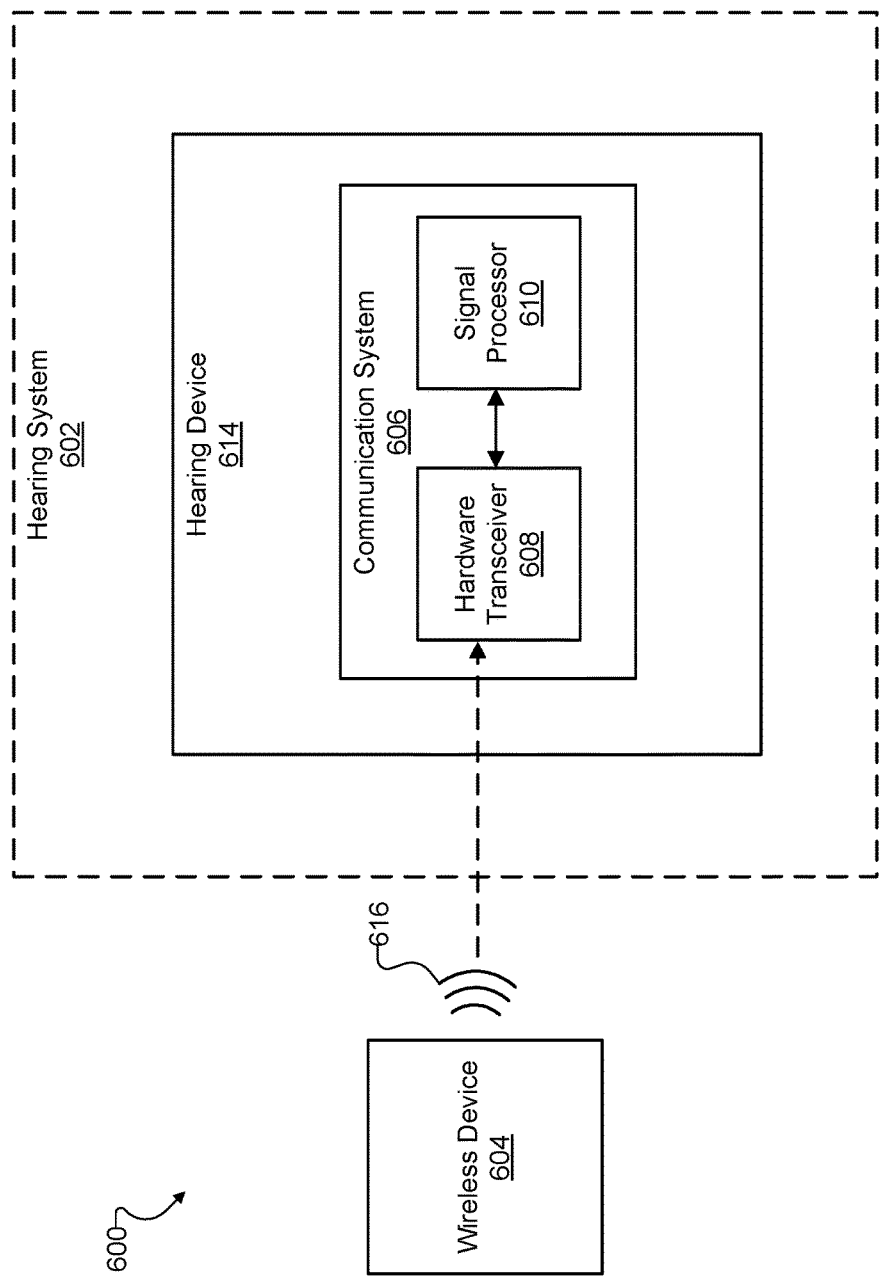
FIG. 6 illustrates another exemplary implementation of the configuration of FIG. 1 in which another type of hearing system receives and processes signals from one or more devices external to the hearing system according to principles described herein.

To illustrate, FIG. 6 shows a configuration 600 that is yet another exemplary configuration analogous to configuration 100. Similar to configuration 100 and other configurations described above, configuration 600 includes a hearing system 602, a wireless device 604 that transmits wireless signals to hearing system 602, a communication system 606 with a hardware transceiver 608 and a signal processor 610 for receiving and processing the wireless signals, and a hearing device 614 for applying stimulation representative of signals output by communication system 606 to a user of hearing system 602. However, in contrast to configuration 100 and the other configurations described above, configuration 600 illustrates a communication system (i.e., communication system 606) that is not separate from and coupled to a hearing device (i.e., hearing device 614), but, rather, is integrated with (e.g., built into, included within, etc.) the hearing device. Specifically, as shown in FIG. 6, hearing system 602 may be completely implemented as one device.

Hearing system 602 may represent at least part of any of the hearing systems described herein. For example, hearing system 602 may represent a hearing aid that includes a built-in communication system (e.g., a built-in ability to receive and process wireless signals). In other examples, hearing system 602 may represent at least part of a cochlear implant system (e.g., one or more of the components typically residing external to the patient such as the microphone, the sound processor, the headpiece, and the like. Additionally or alternatively, hearing system 602 may represent an entire cochlear implant system (e.g., even including implanted components such as the cochlear implant, the lead with the electrodes disposed thereon, etc.). For example, hearing system 602 may represent a cochlear implant system that is fully implantable within the user (i.e., such that signal receiving and processing is performed internal to the user).

The integration of hearing device 614 and communication system 606 shown in configuration 600 may provide certain advantages to hearing system users and manufacturers. For example, by eliminating the need to provide an external interface connection (e.g., such as connection 112 of configuration 100, plug-in interfaces 212 and 412 of configurations 200 and 400, respectively, and wireless audio interface 312 of configuration 300), the design of both hearing device 614 and communication system 606 may be optimized, resulting in increased reliability of the whole system due to the removal of the additional mechanical and/or wireless interface. Moreover, in some examples, hearing device 614 may be miniaturized compared to previous designs, making hearing device 614 less conspicuous and less burdensome to wear, allowing hearing device 614 to use less power and enjoy longer battery life, and/or providing other benefits associated with these technological improvements.

Unfortunately, however, certain disadvantages may also be associated with integrating communication system 606 into hearing device 614 in certain examples. For instance, user familiarity, customer purchasing paradigms, reimbursement schemes, and other practical and/or non-technological aspects of how hearing systems receive and perform signal processing of wireless signals may discourage and impede the use and sale of integrated hearing systems such as hearing system 602. Specifically, for example, in certain countries, reimbursement rules require that hearing devices are purchased independently from communication systems, which is not possible when communication systems are integrated directly within the hearing devices.

One major type of customer for communication system accessories to hearing devices has conventionally been institutional entities associated with venues where presentations are made (e.g., schools, theaters, presentation facilities, etc.). To compete for market share among such customers requires hearing system manufacturers to offer a product that functions universally (e.g. without regard to hearing system type, brand, technology generation, etc.). Accordingly, it may be desirable to offer communication systems that operate to perform signal processing functions for conventional hearing devices that cannot perform such functions themselves, as well as to enable (e.g., allow, license, etc.) integrated hearing devices to perform such signal processing functions themselves using their built-in hardware.

Figure 7:
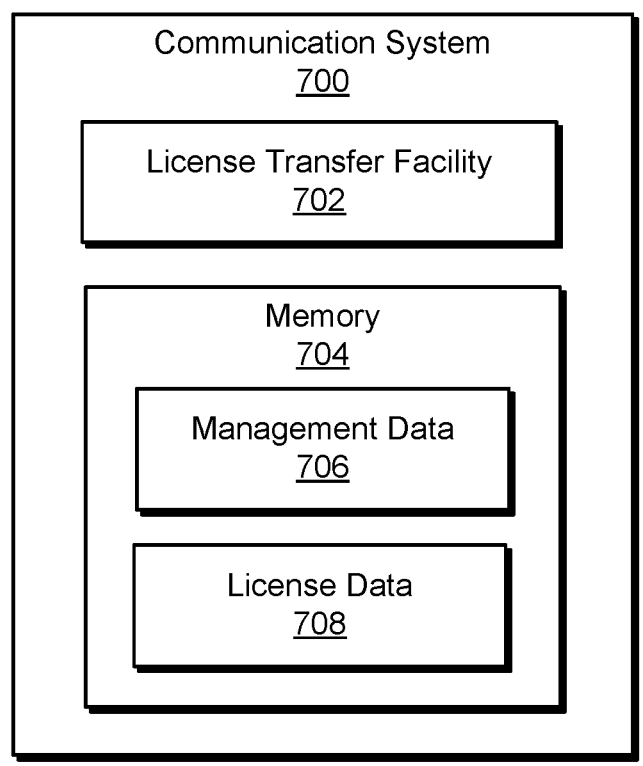
FIG. 7 illustrates an exemplary communication system for license-enabled signal processing of signals according to principles described herein.

To this end, FIG. 7 illustrates an exemplary communication system 700 for license-enabled signal processing of wireless signals that benefits many or all of the parties described above (e.g., users, customers, manufacturers, etc.) by, for example, providing or facilitating the technological benefits of miniaturized, reduced-power hearing devices while avoiding the practical and non-technological pitfalls that such hearing devices may be associated with. For example, communication system 700 may be implemented as (e.g., may include, be implemented within, etc.) any of the types of systems or devices described above. Specifically, as will be described and illustrated below, communication system 700 may be implemented as a standalone communication system (e.g., to operate analogously with hearing device plug-in accessories, hearing device streamer accessories, and/or other such accessories described above), or may be implemented as a hearing device (i.e., integrated with a hearing aid, a sound processor of a cochlear implant system, or another such hearing device described above). As will be made apparent, configurations that include both types of communication system 700 (i.e., a standalone communication system and a communication system integrated within a hearing device) may provide many or all of the benefits even while avoiding the disadvantages described herein.

As shown in FIG. 7, communication system 700 may include, without limitation, a license transfer facility 702, and a memory 704 selectively and communicatively coupled to one another. It will be recognized that although license transfer facility 702 and memory 704 are shown to be separate facilities in FIG. 7, license transfer facility 702 and memory 704 may be combined into fewer facilities, such as into a single facility, or divided into more facilities as may serve a particular implementation. License transfer facility 702 and memory 704 will now be described in more detail.

Memory 704 may include any type of transitory or non-transitory memory and/or storage capacity for maintaining any suitable data that may be used by license transfer facility 702 or otherwise used by communication system 700. For example, as shown, memory 704 may maintain (e.g., store) management data 706, license data 708, and/or any other data as may serve a particular implementation. Specifically, within management data 706, memory 704 may maintain data received, generated, managed, maintained, used, and/or transmitted by license transfer facility 702 to perform any of the operations described herein. Likewise, within license data 708, memory 704 may maintain one or more signal processing licenses or data associated with such signal processing licenses.

A signal processing license may include or be implemented by any suitable dataset that allows communication system 700 to perform (e.g., while the signal processing license is maintained by communication system 700) a license-enabled signal processing function on wireless signals received by communication system from one or more devices external to the communication system. For example, the signal processing license may include or be implemented by a key that allows the performance of the license-enabled signal processing function by enabling or unlocking functionality related to the signal processing function, by a token that allows the performance of the license-enabled signal processing function by providing permission to communication system 700 to use the functionality related to the signal processing function, or by any other similar dataset as may serve a particular implementation. Similarly, the license-enabled signal processing function allowed by the signal processing license may include any suitable signal processing function such as any signal processing function described herein. As described above, however, in contrast to certain signal processing functions, a license-enabled signal processing function may only be performed by a communication system that currently maintains a signal processing license.

License transfer facility 702 may include one or more physical computing components (e.g., hardware and/or software components such as a processor, additional memory or cache to supplement memory 704, a communication interface, instructions stored on memory 704 or the additional memory for execution by the processor, etc.) to facilitate the maintaining of the license-enabled signal processing function on memory 704. Additionally, the at least one physical computing components included within license transfer facility 702 may be configured to detect (e.g., while the signal processing license is maintained within memory 704) that an additional communication system is within a transfer range of the communication system.

In response to the detection that the additional communication system is within the transfer range of the communication system, license transfer facility 702 may be configured to perform a transfer operation in which the signal processing license is transferred from the communication system to the additional communication system such that the signal processing license is no longer maintained within the memory once the transfer operation is completely performed. For example, the transfer operation may allow the additional communication system to perform the license-enabled signal processing function subsequent to the transfer operation while preventing the communication system from being able to perform the license-enabled signal processing function subsequent to the transfer operation.

In some examples, communication system 700 may receive, maintain, and or transfer one or more signal processing licenses to one or more additional communication systems without regard to whether a particular signal processing license is associated with communication system 700 or any other communication system in any particular way. For example, a presentation venue (e.g., a school, a theater, etc.) may purchase a particular number of communication systems (e.g., hearing device plug-in accessories, hearing device streamer accessories, etc.) such that the presentation venue owns a corresponding number of signal processing licenses. The signal processing licenses may then be distributed to patrons of the presentation venue as needed (e.g., remaining with the standalone communication systems, or being temporarily transferred to patrons' hearing systems that include built-in communication systems) without regard to any particular signal processing license being permanently tied to any particular patron or hearing system.

Additionally or alternatively, in certain examples, a particular signal processing license may be shared between two or more specific communication systems. For example, a user who uses a hearing system with an integrated communication system may also obtain (e.g., purchase as an accessory to the hearing system, etc.) a dedicated communication system having a signal processing license that the user may transfer to his or her integrated communication system in order to enable the communication system as necessary.

Figure 8A:
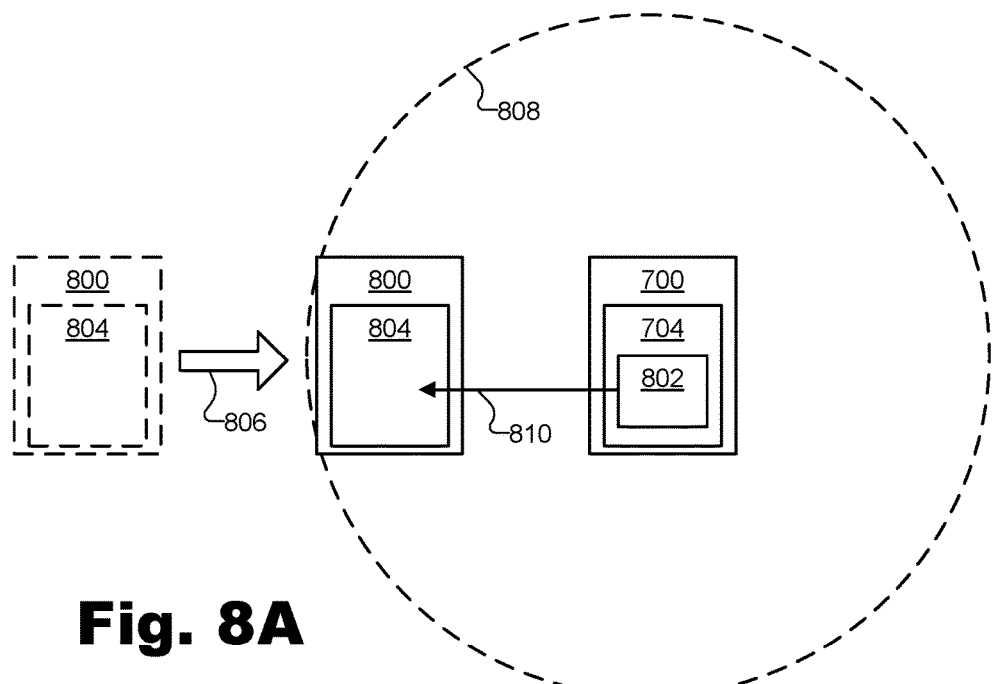
FIGS. 8A-8B illustrate exemplary configurations in which the communication system of FIG. 7 and an additional communication system perform transfer operations with respect to a shared signal processing license according to principles described herein.
Figure 8B:
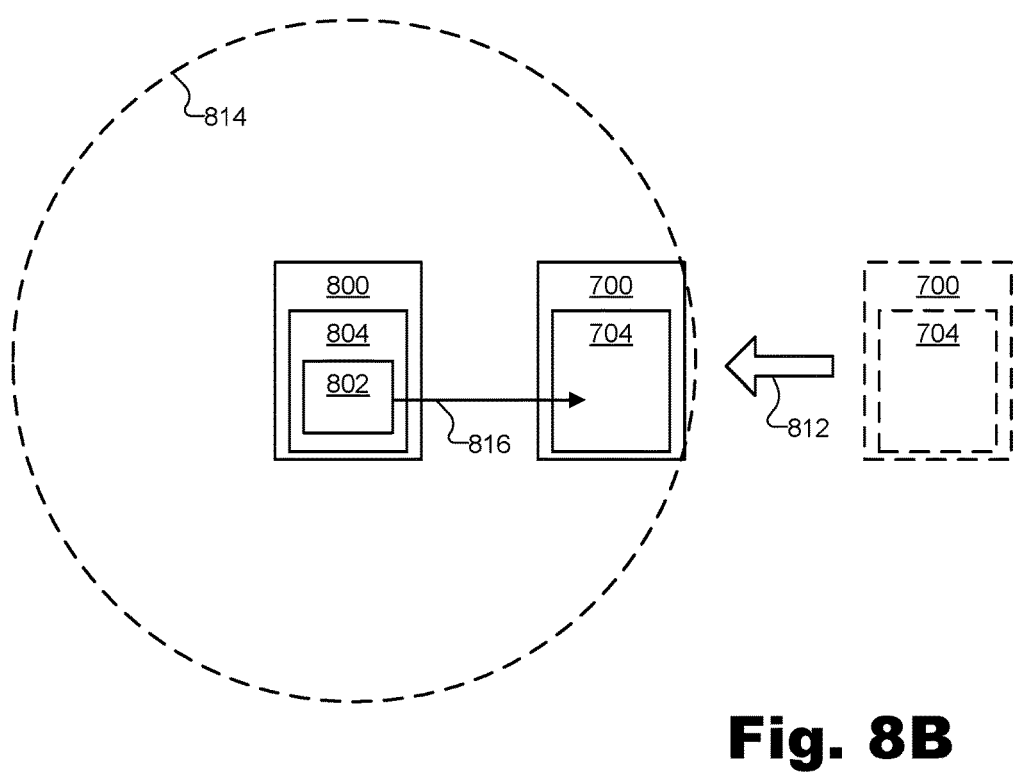

To illustrate, FIGS. 8A and 8B show exemplary configurations in which communication system 700 and an additional communication system 800 perform transfer operations with respect to a signal processing license 802 shared by communication system 700 and communication system 800. As shown, FIGS. 8A and 8B illustrate communication system 700, which is shown to include certain elements (e.g., memory 704), as described above in relation to FIG. 7. It will be understood that communication system 700 may include the same elements and may perform the same functionality described above even though, for simplicity of illustration, certain elements of communication system 700 (e.g., license transfer facility 702) are not explicitly shown in FIGS. 8A and 8B. For example, signal processing license 802 may be included within license data 708, stored within memory 704.

Moreover, it will be understood that communication system 800 (i.e., the additional communication system shown to communicate with communication system 700 in FIGS. 8A and 8B) may likewise include the same elements as communication system 700 (e.g., including a memory 804 similar to memory 704, etc.) and may perform the same functionality described above with respect to FIG. 7 (e.g., performing a license-enabled signal processing function while signal processing license 802 is maintained within memory 804). For example, as with communication system 700, communication system 800 may be implemented as any of the types of systems or devices described above (e.g., standalone communication systems, integrated communication systems, etc.). However, this is not to say that communication systems 700 and 800 are necessarily identical. While both communication systems 700 and 800 may include certain similar elements and functional capabilities, as described above, one of the communication systems may be implemented as a standalone communication system (e.g., an accessory configured to enable a license-enabled signal processing function), while the other communication system may represent a communication system that is implemented as (e.g., that includes or is integrated within) a hearing device within a hearing system (e.g., a hearing device that has various additional capabilities). Specific examples of how each communication system may be implemented will be described and illustrated in more detail below with respect to FIGS. 9 and 10.

As shown in FIG. 8A, communication system 700 may maintain signal processing license 802 within memory 704 so as to perform a license-enabled signal processing function on wireless signals received by communication system 700 while signal processing license 802 is maintained by communication system 700. Communication system 700 may then detect that communication system 800 is within (i.e., as illustrated by a proximity change 806 of communication system 800) a transfer range 808 of communication system 700. In response to the detection that communication system 800 is within transfer range 808 (i.e., based on the proximity of communication system 700 to communication 800 subsequent to proximity change 806), communication system 700 may perform a transfer operation 810 in which signal processing license 802 is transferred from communication system 700 to communication system 800 (i.e., to memory 804 of communication system 800) such that signal processing license 802 is no longer maintained within memory 704 of communication system 700 once transfer operation 810 is completely performed.

In certain examples, the transfer operation 810 may be performed automatically in the sense that no explicit request (e.g., a request initiated in response to a user button press or the like) may be provided in order to initiate performance of transfer operation 810. For instance, transfer operation 810 may be performed automatically as soon as communication systems 700 and 800 are within a suitable proximity of one another (e.g., within transfer range 808). In other examples, however, because communication systems 700 and 800 may share signal processing license 802 such that only one of communication systems 700 and 800 may use signal processing license 802 at a time (i.e., rendering the other communication system that does not maintain signal processing license 802 unable to perform the license-enabled signal processing function), it may be desirable to put additional measures in place to prevent accidental, fraudulent, or other unwanted or unexpected transfer operations of signal processing license 802. One or more of such measures may be implemented to ensure that transfer operation 810 is only performed on signal processing license 802 when appropriate, as will now be described.

One measure that may be implemented to ensure that transfer operation 810 is not performed accidentally, erroneously, fraudulently, or the like, is that transfer operation 810 may only be performed in response to an occurrence of a proximity event between communication systems 700 and 800. For example, as described above, communication system 700 may only perform transfer operation 810 in response to a detection that communication system 800 is within transfer range 808 of communication system 700, or, in other words, that communication system 800 is already or has entered to be within a predetermined proximity of communication system 700. This detection may be performed in any suitable way. For example, communication system 700 may detect that communication system 800 is within transfer range 808 by detecting (e.g., by measuring or otherwise determining) a field strength of a radio signal generated by communication system 800, and by determining (e.g., based on the detected field strength) that a received signal strength indication ("RSSI") associated with communication system 800 exceeds a predetermined RSSI threshold.

Transfer range 808 may represent any suitable range (e.g., distance, proximity, etc.) from communication system 700 as may serve a particular implementation. For example, transfer range 808 of communication system 700 may be a maximum distance from communication system 700 at which a wireless communication protocol (e.g., the wireless communication protocol by way of which transfer operation 810 is to be performed) is functional to successfully perform transfer operation 810. In other words, if the wireless communication protocol that is to be used to perform transfer operation 810 is, for example, a near-field communication ("NFC") protocol configured to operate only between devices that are a few centimeters apart, transfer range 808 may be a few centimeters. Conversely, as another example, if the wireless communication protocol that is to be used to perform transfer operation 810 is a Bluetooth protocol configured to operate between devices that are several meters apart, transfer range 808 may be several meters.

In certain examples, in order to decrease the probability of inadvertent or fraudulent license transfer operations, transfer range 808 of communication system 700 may be a predetermined distance from communication system 700 that is less than the maximum distance from communication system 700 at which the wireless communication protocol by way of which transfer operation 810 is to be performed is functional to successfully perform transfer operation 810. In other words, even if the wireless communication protocol is, for example, a Bluetooth protocol configured to operate between devices that are several meters apart, transfer range 808 may be set to be less than the maximum of several meters at which the Bluetooth wireless communication protocol could successfully function. Instead, for example, transfer range 808 may be set to be just a few centimeters to require close proximity between communication systems 700 and 800, thereby reducing the probability of wrongful transfers since it may be less likely that communication systems 700 and 800 will come into very close proximity unless transfer operation 810 is desirable.

Moreover, other measures beyond proximity-based measures may similarly be implemented to prevent unwanted transfer operations. For example, a user of communication system 800 may indicate, by way of communication system 800, that transfer operation 810 is desired (i.e., is a purposeful, authorized transfer operation) by, for instance, pushing a button included on a hearing device, power pack system, streamer accessory, or the like associated with communication system 800. As such, communication system 700 may receive (e.g., while signal processing license 802 is maintained within memory 704) a license transfer request from communication system 800, and communication system 700 may perform transfer operation 810 in response to the receipt of the license transfer request.

Additionally or alternatively, a user of communication system 700 may indicate, by way of communication system 700, that transfer operation 810 is desired (i.e., is a purposeful, authorized transfer operation) by, for example, pushing a button included on a hearing device, power pack system, streamer accessory, or the like associated with communication system 700. As such, communication system 700 may transmit (e.g., while signal processing license 802 is maintained within memory 704 and/or in response to the detection that communication system 800 is within transfer range 808 of communication system 700) a license transfer request to communication system 800. In response to the license transfer request, communication system 700 may receive from communication system 800 an optional license transfer acknowledgement, and, thus, may perform transfer operation 810 in response to the receipt of the license transfer acknowledgement.

Yet other measures that may be implemented to ensure that only intentional, authorized transfer operations of signal processing license 802 are performed may include contextual analyses of whether transfer operation 810 is valid. For example, communication system 700 may determine (e.g., while signal processing license 802 is maintained within memory 704 and in response to the detection that communication system 800 is within transfer range 808 of communication system 700) that communication system 800 does not currently maintain any active signal processing license (e.g., an additional signal processing license similar to signal processing license 802). Additionally, communication system 700 may determine that communication system 800 is compatible with signal processing license 802 and/or with communication system 700 itself.

For example, different types of signal processing licenses may be available (e.g., general licenses, bulk licenses, educational licenses, etc.) at different prices and/or targeted at different types of customers. Similarly, different communication systems may be distributed to and used by different types of customers. Thus, communication system 700 may ensure, prior to performing transfer operation 810, that the license types, communication system types, etc., of communication systems 700 and 800 and signal processing license 802 all properly align. Accordingly, communication system 700 may perform transfer operation 810 in response to the determination that communication system 800 does not currently maintain the additional signal processing license and that communication system 800 is compatible with signal processing license 802 and/or with communication system 700.

Yet other measures that may be implemented to ensure that only intentional, authorized transfer operations of signal processing license 802 are performed (e.g., automatically performed) may include only performing transfer operation 810 when communication system 700 and/or 800 are in a license transfer mode. For example, communication system 700 may determine (e.g., while signal processing license 802 is maintained within memory 704 and in response to the detection that communication system 800 is within transfer range 808) if communication system 700 is in a license transfer mode and, only once communication system 700 is in the license transfer mode, may perform transfer operation 810. Additionally or alternatively, as another example, communication system 700 may determine that communication system 800 is in a license transfer mode, and may automatically perform transfer operation 810 in response to the determination that communication system 800 is in the license transfer mode.

Communication systems 700 and/or 800 may enter and remain within a license transfer mode based on any suitable criteria, events, time limits, or the like. For instance, in certain implementations, a communication system implemented within a hearing device such as a hearing aid may be configured to enter the license transfer mode automatically when the hearing device is powered on (e.g., by a switching on of a power switch, by a closing of a battery door, etc.) and may remain in the license transfer mode for a predetermined amount of time (e.g., 30 seconds, 1 minute, etc.) thereafter. Meanwhile, a standalone communication system implemented as an accessory configured to enable a hearing device to perform a license-enabled signal processing function, may remain in a license transfer mode at all times, may temporarily enter a license transfer mode in response to a user input, or based on other criteria, time limits, and so forth.

In certain examples, fraudulent license transfers may further be prevented by implementing security measures with respect to communications between communication systems 700 and 800. For example, data transferred as part of transfer operation 810 may be encrypted such that, even if the data were to be wrongfully intercepted, the data would be unreadable and/or otherwise unusable without proper secret keys, certificates, etc., that are uniquely known to the intended recipient of the communication (e.g., communication system 800).

Additionally, along with preventing accidental and fraudulent license transfers between communication systems 700 and 800, it may also be desirable to implement measures that ensure the integrity of license transfer operations to guarantee, for instance, that exactly one of communication systems 700 and 800 is properly licensed to perform the license-enabled signal processing function at all times (i.e., that there is no time, or that times are minimized, where both or neither of communication systems 700 and 800 are licensed to perform the license-enabled signal processing function). For example, various suitable handshaking techniques may be used to deactivate one communication system 700 (i.e., disallow communication system 700 from performing the license-enabled signal processing function) only once there is positive feedback (e.g., data representative of an acknowledgement) from communication system 800 that transfer operation 810 was successful and that signal processing license 802 has been received.

As described above, subsequent to transfer operation 810 (i.e., once transfer operation 810 has been completely performed), communication system 800 may perform the license-enabled signal processing function while communication system 700 may be prevented from being able to perform the license-enabled signal processing function. This may last until a subsequent transfer operation is performed to cause signal processing license 802 to be transferred from communication system 800 back to communication system 700.

To illustrate, FIG. 8B shows that communication system 800 may maintain signal processing license 802 within memory 804 subsequent to transfer operation 810, described above in relation to FIG. 8A. However, communication system 700 may detect (e.g., while signal processing license 802 is maintained by communication system 800 and not by communication system 700) that communication system 700 is already within a transfer range 814 or communication system 800, or that communication system 700 enters (e.g., due to a proximity change 812 between communication systems 700 and 800) the transfer range 814 of communication system 800. While the arrow associated with proximity change 812 is shown to be associated with communication system 700, it will be understood that either or both of communication systems 700 and 800 may physically move to cause the proximity change associated with communication system 700 entering transfer range 814. Transfer range 814 may be a similar range or a different range as transfer range 808, described above with respect to FIG. 8A.

In response to the detection that communication system 700 is already within or has entered transfer range 814 of communication system 800, communication systems 700 and 800 may perform a transfer operation 816 in which signal processing license 802 is transferred from communication system 800 back to communication system 700 such that signal processing license 802 is again maintained within memory 704 of communication system 700 once transfer operation 816 is completely performed. As such, transfer operation 816 may allow communication system 700 to again perform the license-enabled signal processing function subsequent to transfer operation 816, and may prevent communication system 800 from being able to perform the license-enabled signal processing function subsequent to transfer operation 816.

As mentioned above, in various configurations, both communication systems in a license transfer operation (e.g., both communication systems 700 and 800) may include similar properties and capabilities with respect to the functionality of a communication system described above. However, as will now be described in more detail, exactly one (i.e., one but not both) of communication systems 700 and 800 may include (e.g., be integrated with, built into, etc.) another system or device such as a hearing device included within a hearing system such that, in addition to the communication system functionality described above, the communication system and the device integrated with the communication system integrated may provide further functionality not provided by the other communication system. For example, a communication system integrated with a hearing device in a hearing system may be further configured to provide stimulation to a user to facilitate the user in perceiving an acoustic signal upon which a digital audio transmission received and processed by the communication system is based.

Figure 9:
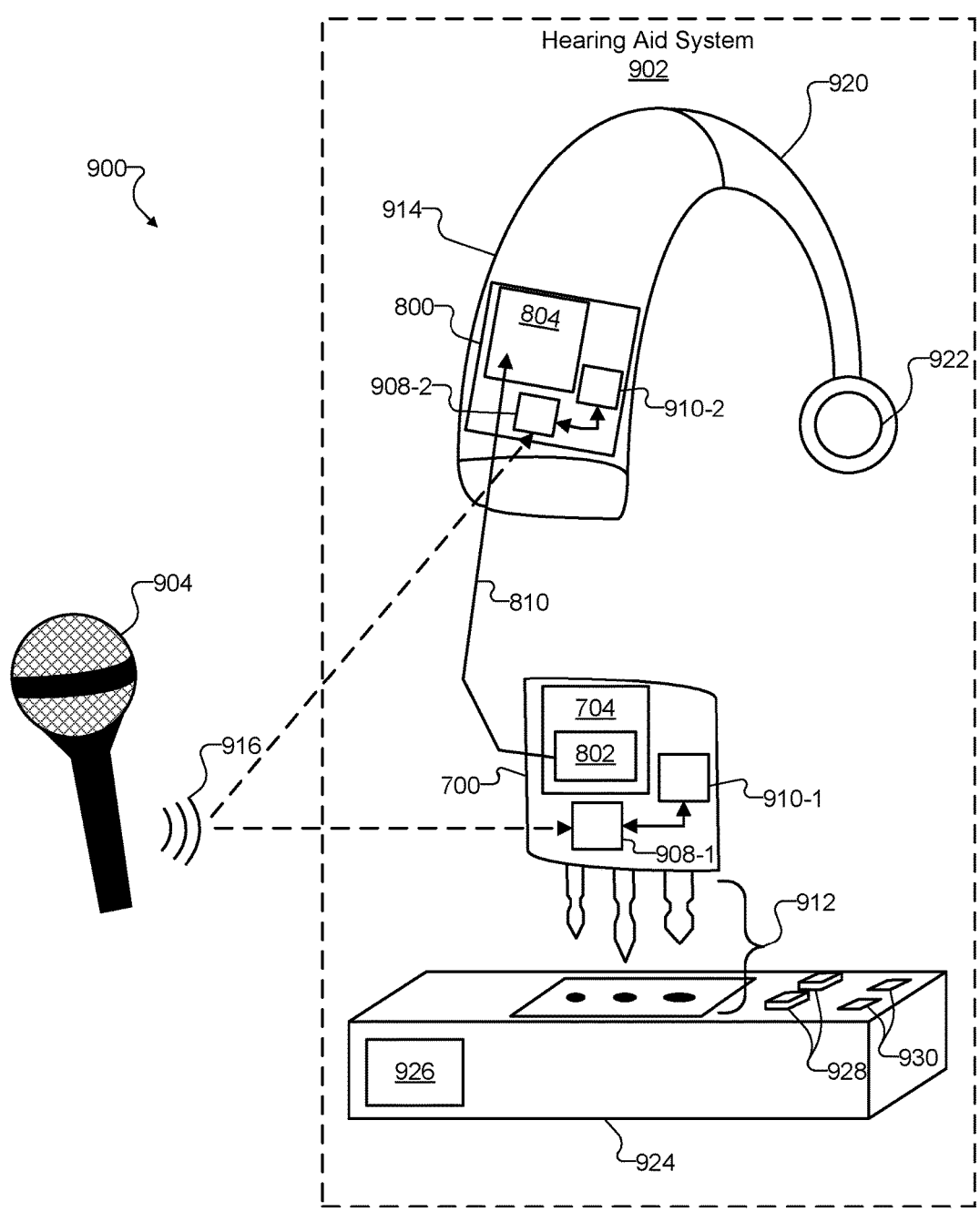
FIGS. 9-10 illustrate exemplary configurations in which exemplary communication systems perform license-enabled signal processing of signals according to principles described herein.
Figure 10:
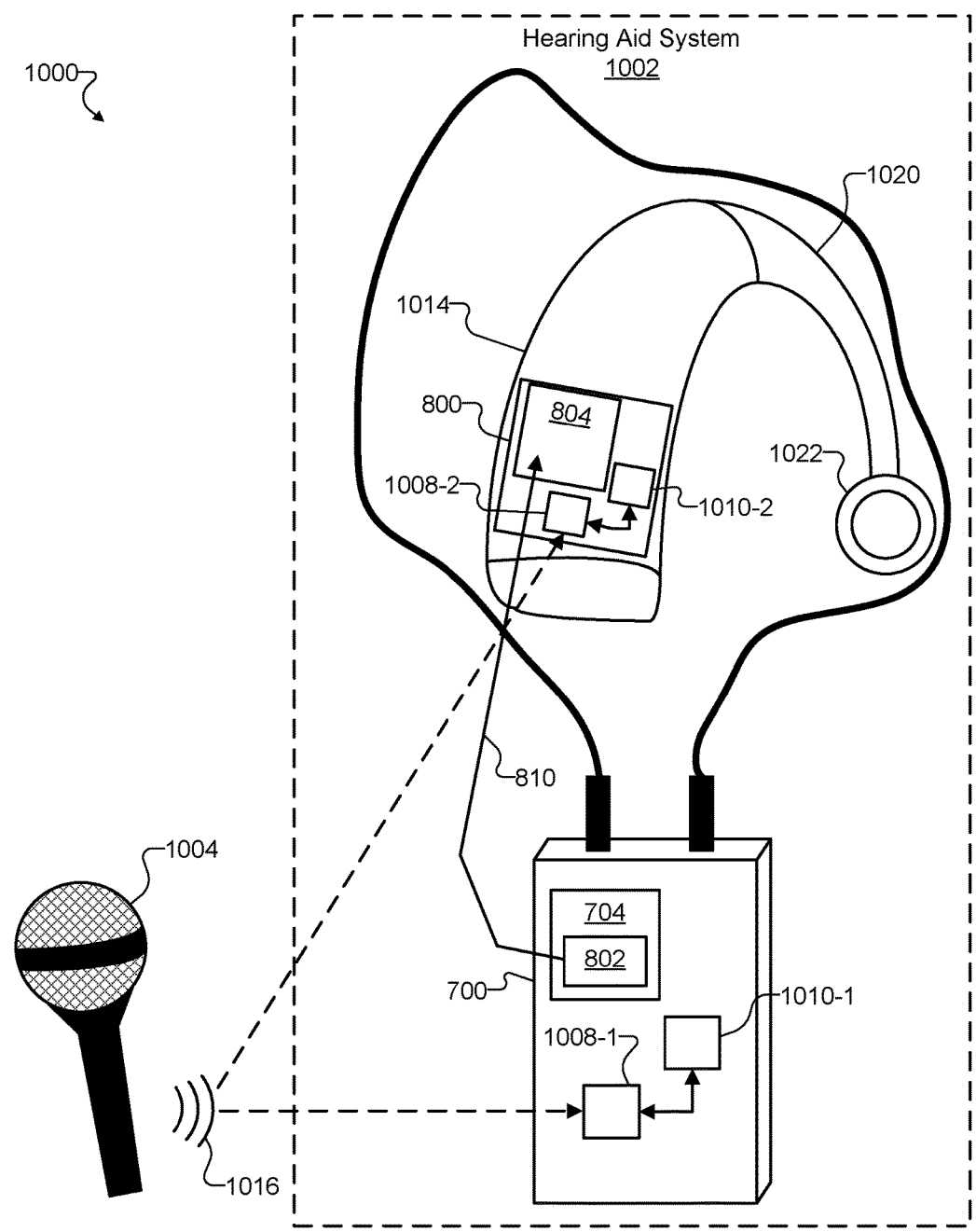

To illustrate, FIGS. 9 and 10 show exemplary configurations 900 and 1000, respectively, in which exemplary communication systems 700 and 800 perform license-enabled signal processing of wireless signals. In FIGS. 9 and 10, the same numbering scheme described above with respect to FIGS. 1, 2, 3, 4, and 6 may be used. For example, a hearing aid system 902 that is analogous with systems 102, 202, 302, 402, and 602 (i.e., in configurations 100, 200, 300, 400, and 600, respectively) may receive wireless signals from a wireless microphone 904 that is analogous with wireless devices 104, 204, 304, 404, and 604 (i.e., in configurations 100, 200, 300, 400, and 600, respectively), and so forth.

However, as shown, in place of the communication systems described above in relation to FIGS. 1, 2, 3, 4, and 6, respectively (i.e., communication systems 106, 206, 306, 406, and 606), FIGS. 9 and 10 include communication systems 700 and 800, which were described above in relation to FIGS. 7 and 8. As such, it will be understood that the communication systems in FIGS. 9 and 10 include the same functionality and elements described above with respect to FIGS. 7 and 8, even if certain elements and/or functionality of communication systems 700 and 800 are not explicitly reiterated or illustrated with respect to configurations 900 and 1000.

In FIGS. 9 and 10, communication system 700 may include what has been referred to herein as a standalone communication system. In other words, communication system 700 may be implemented, in configuration 900, as a communication system that exists primarily to perform a license-enabled signal processing function or share a signal processing license to enable another communication system (e.g., communication system 800) to perform the license-enabled signal processing function, but not necessarily to act as a hearing device or hearing system by itself. Conversely, communication system 800 may include (e.g., be implemented with) a hearing device that includes at least one physical computing component to perform the operations described above as being performed by communication systems such as communication system 700, but that also includes circuitry, software, etc., that enable communication system 800 to facilitate hearing of the user as described above for hearing systems 102, 202, 302, 402, and/or 602. However, in contrast to the communication systems included with the above hearing systems, communication system 800 (i.e., within hearing aid systems 902 and 1002) may lack an interface such as plug-in interfaces 212 and 412 and/or wireless audio interface 312. For example, as shown, communication system 800 may lack an electrical interface by which a hearing device plug-in accessory separate from communication system 800 is configured to communicatively and detachably couple with the hearing device included within (e.g., implementing) communication system 800. Instead, a hardware transceiver that is built into the hearing device may be configured to receive the wireless signals from the one or more devices external to the communication system, as will be described below.

More specifically, referring to FIG. 9, configuration 900 may include a hearing aid system 902 that is sent wireless signals from a wireless microphone 904. Communication system 700 may include memory 704, in which signal processing license 802 may be maintained at a particular point in time. Additionally, communication system 700 may include a hardware transceiver 908-1 for receiving the wireless signals and a signal processor 910-1 for performing or facilitating the performance of a license-enabled signal processing function with respect to the wireless signals when communication system 700 is plugged into a hearing device (e.g., hearing aid 214, sound processor 414, etc.) that is not integrated with a built-in communication system. As further shown in configuration 900, a hearing aid 914 may be integrated with communication system 800. This integration of communication system 800 with hearing aid 914 may eliminate a need for hearing aid 914 to provide an interface to accept a standalone communication system accessory such as communication system 700.

Accordingly, rather than receiving a digital audio transmission 916 from wireless microphone 904 and providing an electrical audio signal representative of digital audio transmission 916 (e.g., such as signals 118, 218, and/or 418 of FIGS. 1, 2, 3, and 4, respectively) to hearing aid 914, communication system 700 may be configured to perform transfer operation 810 of signal processing license 802 (i.e., as described above in relation to FIG. 8). Thus, subsequent to transfer operation 810, signal processing license 802 may be maintained in memory 804 of communication system 800 rather than memory 704 of communication system 700, and hearing aid 914 may receive digital audio transmission 916 and perform the license-enabled signal processing function itself (i.e., without assistance from communication system 700) using a hardware transceiver 908-2 and a signal processor 910-2 within communication system 800 while signal processing license 802 is maintained within memory 804. As shown, hearing aid 914 may also include an ear hook 920 and an earpiece 922 for facilitating hearing of the user as described above.

Because, as a hearing device plug-in accessory, the implementation of communication system 700 in FIG. 9 may typically be plugged into a hearing device or other powered system and derive power therefrom, this implementation of communication system 700 may lack a dedicated or independent power source (in contrast with the implementation of communication system 800 in configuration 900, which is implemented with hearing aid 914 and may receive power therefrom). As such, in order to properly perform the operations described herein (e.g., to detect that communication system 800 is within a transfer range of communication system 700, to perform a transfer operation of signal processing license 802, etc.), communication system 700 may include (e.g., may be sold or distributed with, may operate using, etc.) a power pack system 924.

As shown in FIG. 9, power pack system 924 may be associated with (e.g., may include or otherwise have access to) a power supply 926, and may provide an electrical interface 912 (e.g., a plug-in interface similar to plug-in interfaces 212 and 412). As such, communication system 700 (i.e., including or implemented by a hearing device plug-in accessory, as shown in FIG. 9) may be configured to communicatively and detachably couple with power pack system 924 by way of electrical interface 912 to receive operating power by which to power various components of communication system 700 from power supply 926. Additionally, communication system 700 may be configured to communicatively and detachably couple with another hearing device separate from communication system 700 by way of an electrical interface provided by the hearing device separate from the communication system. For example, communication system 700 may be configured to communicatively and detachably couple with hearing aid 214 or sound processor 414 (described above) by way of plug-in interfaces 212 and 412, respectively, to provide an audio signal to these hearing devices. More particularly, for instance, communication system 700 may provide an audio signal that is based on the performance of the license-enabled signal processing function on wireless signals received by communication system 700 (e.g., digital audio transmission 916 received from wireless microphone 904) to the respective hearing device separate from communication system 700 while signal processing license 802 is maintained by communication system 700 and while communication system 700 remains communicatively and detachably coupled with the hearing device by way of the electrical interface provided by the hearing device.

Hearing device plug-in accessories such as the implementation of communication system 700 shown in configuration 900 may be implemented with any electrical interfaces as may serve a particular implementation. For example, electrical interface 912 (i.e., provided by power pack system 924), as well as any plug-in interface provided by a hearing device separate from communication system 700 that may be configured to detachably couple with communication system 700, may be implemented as universal Europlug interfaces. As such, communication system 700 (i.e., the hearing device plug-in accessory included within communication system 700) may be configured to communicatively and detachably couple with power pack system 924 and with any additional hearing devices separate from communication system 700 (e.g., hearing aid 214, sound processor 414, etc.) by way of the respective universal Europlug interfaces. In other examples, the electrical interface 912 and/or the plug-in interface provided by other hearing devices (e.g., plug-in interfaces 212, 412, etc.) may be implemented as proprietary interfaces or as any physical interfaces as may serve a particular implementation.

Due to a limited number of conductors included in electrical interface 912 and/or a relative simplicity of communication system 700 and/or power pack system 924, communications between communication system 700 and power pack system 924 may be relatively simple. For instance, if electrical interface 912 is implemented as a universal Europlug interface, only three conductors (i.e., a power input conductor, a ground conductor, and an audio output conductor) may be provided by electrical interface 912. Accordingly, basic communications from communication system 700 to power pack system 924 may be basic, and may be performed in any suitable manner. For example, the hearing device plug-in accessory of FIG. 9 (i.e., communication system 700) may communicate with power pack system 924 by transmitting (e.g., by way of an audio conductor included in electrical interface 912) an audio tone selected from a plurality of audio tones representative of different communications. For example, a first audio tone at a particular pitch or frequency may be representative of an indication that communication system 800 has been detected to be within a transfer range of communication system 700, a second audio tone at a different pitch or frequency may be representative of an indication that a transfer request has been detected from communication system 800, and so forth.

Basic communications in the other direction (e.g., from power pack system 924 to communication system 700) may similarly be performed in any suitable way. For instance, power pack system 924 may provide an impedance with respect to another conductor of the electrical interface (e.g., an impedance on an audio conductor with respect to a ground conductor within electrical interface 912, or on one or more of the other conductors included within electrical interface 912) selected from a plurality of impedances representative of different communications. For example, a particular impedance (e.g., an impedance different from impedances provided by hearing devices such as hearing aids, sound processors, etc.) may be provided to indicate that communication system 700 is plugged into power pack system 924 (as opposed to being plugged into a hearing device such as hearing aid 214 or sound processor 414).

Power pack system 924 may further provide user interfacing options to facilitate a user overseeing proper license transfer between communication systems 700 and 800. For example, as shown, power pack system 924 may include one or more buttons 928 or other such inputs, one or more light-emitting diodes ("LEDs") 930 or other such output indicators, and/or any other input or output interface elements as may serve a particular implementation. As such, power pack system 924 may include a microcontroller and associated executable instructions or basic logic circuitry to implement any suitable user interface functionality. For instance, the microcontroller (not explicitly shown in FIG. 9) may detect that a user has pushed a button 928 indicative of a user request to transfer signal processing license 802 or the like. Similarly, the microcontroller may cause one of LEDs 930 to light up to indicate that transfer operation 810 is ongoing, has completed successfully, returned an error, etc., as the case may be.

FIG. 10 illustrates configuration 1000, which may be similar to configuration 900 of FIG. 9, except that communication system 700 may include (e.g., be implemented with) a hearing device streamer accessory rather than a hearing device plug-in accessory (as was shown in FIG. 9). In particular, configuration 1000 may include a hearing aid system 1002 that is sent wireless signals from a wireless microphone 1004. Communication system 700 may include memory 704, in which signal processing license 802 may be maintained at a particular point in time. Additionally, communication system 700 may include a hardware transceiver 1008-1 for receiving the wireless signals and a signal processor 1010-1 for performing or facilitating the performance of a license-enabled signal processing function with respect to the wireless signals when communication system 700 is coupled with a hearing device that does not include a built-in communication system (e.g., such as hearing aid 314). As further shown in configuration 1000, hearing aid 1014 may be integrated with communication system 800 (i.e., communication system 800 may be built in to hearing aid 1014 rather than or in addition to an interface to couple with a standalone communication system accessory such as communication system 700).

Accordingly, rather than receiving a digital audio transmission 1016 from wireless microphone 1004 and providing a radio audio signal representative of digital audio transmission 1016 (e.g., such as signal 318 of FIG. 3) to hearing aid 1014, communication system 700 may be configured to perform transfer operation 810 of signal processing license 802 (i.e., as described above in relation to FIG. 8). Thus, subsequent to transfer operation 810, signal processing license 802 may be maintained in memory 804 of communication system 800 rather than memory 704 of communication system 700, and hearing aid 1014 may receive digital audio transmission 1016 and perform the license-enabled signal processing function itself (i.e., without assistance from communication system 700) using a hardware transceiver 1008-2 and a signal processor 1010-2 within communication system 800 while signal processing license 802 is maintained within memory 804. As shown, hearing aid 1014 may also include an ear hook 1020 and an earpiece 1022 for facilitating hearing of the user as described above.

As with the hearing device plug-in accessory of configuration 900, in configuration 1000, a hearing device streamer accessory may be used either to perform a license transfer operation (e.g., transfer operation 810) to provide signal processing license 802 to hearing device 1014, or to act as a conventional communication system for a hearing device separate from communication system 800 that provides a wireless audio interface (e.g., wireless audio interface 312 of hearing aid 314).

More specifically, along with detecting that communication system 800 is within a transfer range of communication system 700 and transferring signal processing license 802 to communication system 800 in response, the hearing device streamer accessory of configuration 1000 (i.e., communication system 700) may further be configured to communicatively couple with a hearing device separate from the communication system (e.g., a hearing device such as hearing aid 314) by way of a wireless audio interface provided by the hearing device separate from the communication system (e.g., wireless audio interface 312). The hearing device streamer accessory may provide (e.g., to the hearing device while signal processing license 802 is maintained by communication system 700 and communication system 700 is communicatively coupled with the hearing device by way of the wireless audio interface) a radio signal based on the performance of the license-enabled signal processing function on digital audio transmission 1016 received by communication system 700 from wireless microphone 1004.

Because the implementation of communication system 700 in FIG. 10 (i.e., the hearing device streamer accessory) may typically include a dedicated or independent power source (in contrast with the implementation of communication system 700 in configuration 900) as well as user input elements such as buttons, LEDs, and the like (not explicitly illustrated in FIG. 10), no special power pack system may be required for use with communication system 700 in configuration 1000.

Figure 11:
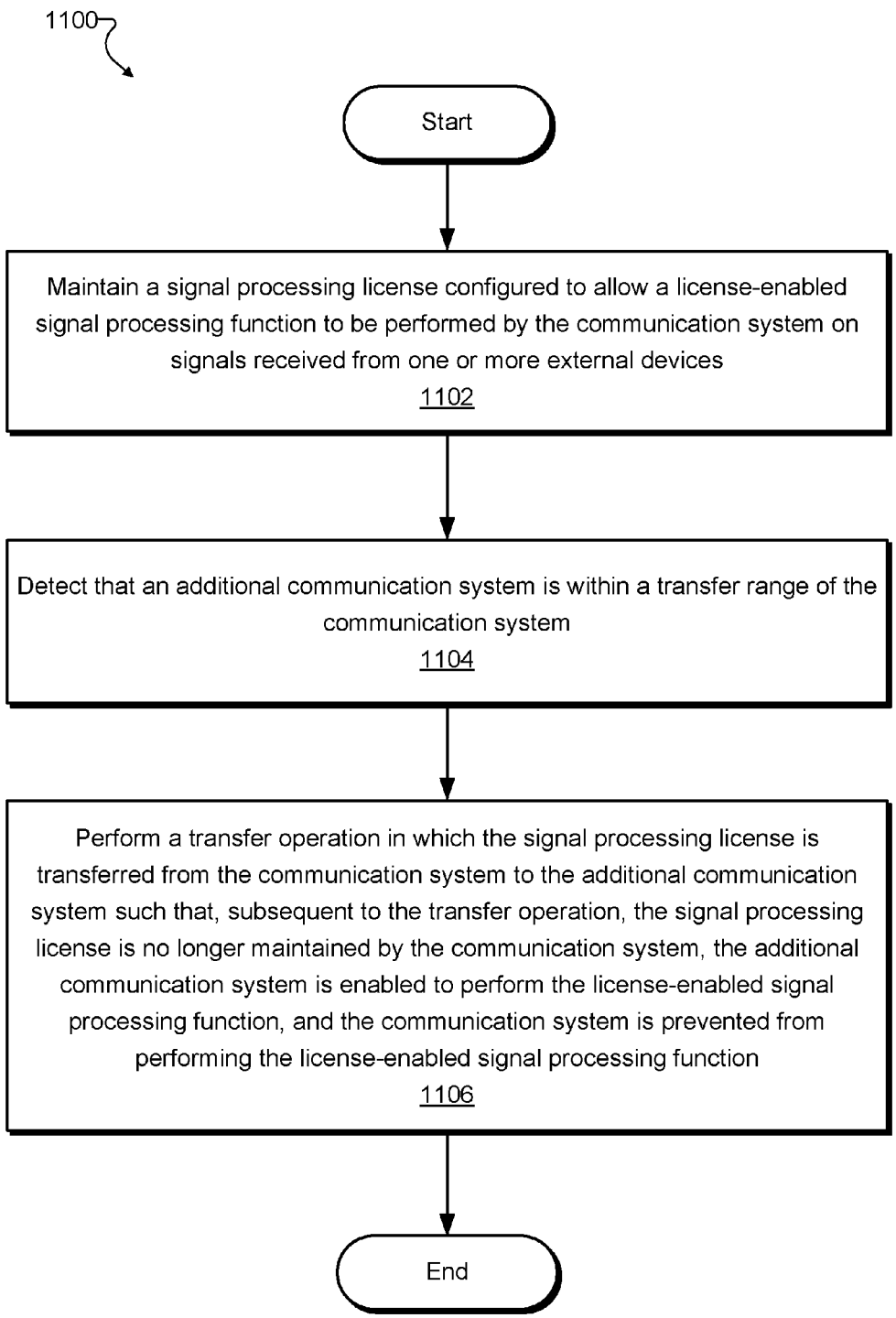
FIG. 11 illustrates an exemplary method for license-enabled signal processing of signals according to principles described herein.

FIG. 11 illustrates an exemplary method 1100 for license-enabled signal processing of wireless signals. One or more of the operations shown in FIG. 11 may be performed by communication system 700 and/or any implementation thereof. While FIG. 11 illustrates exemplary operations according to one embodiment, other embodiments may omit, add to, reorder, and/or modify any of the operations shown in FIG. 11.

In operation 1102, a communication system may maintain (e.g., within a memory of the communication system) a signal processing license. The signal processing license may be configured to allow the communication system to perform a license-enabled signal processing function while the signal processing license is maintained by the communication system. For example, the license-enabled signal processing function may be performed on wireless signals received by the communication system from one or more devices external to the communication system. Operation 1102 may be performed in any of the ways described herein.

In operation 1104, the communication system may detect that an additional communication system is within a transfer range of the communication system. For example, the communication system may detect that the additional communication system is within the transfer range of the communication system while the signal processing license is maintained within the memory. Operation 1104 may be performed in any of the ways described herein.

In operation 1106, the communication system may perform a transfer operation. For example, the communication system may perform the transfer operation in response to the detecting, in operation 1104, that the additional communication system is within the transfer range of the communication system. In some examples, the transfer operation may involve the signal processing license being transferred from the communication system to the additional communication system such that the signal processing license is no longer maintained within the memory of the communication system once the transfer operation is completely performed. As such, in certain examples, the transfer operation may allow the additional communication system to perform the license-enabled signal processing function subsequent to the transfer operation even while preventing the communication system from being able to perform the license-enabled signal processing function subsequent to the transfer operation. Operation 1106 may be performed in any of the ways described herein.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A communication system comprising:
    at least one physical computing device that
        maintains a signal processing license within a memory of the communication system, the signal processing license configured to allow the communication system to perform, while the signal processing license is maintained by the communication system, a license-enabled signal processing function on signals received by the communication system from one or more devices external to the communication system,
        detects, while the signal processing license is maintained within the memory, that an additional communication system is within a transfer range of the communication system, and
        performs, in response to the detection that the additional communication system is within the transfer range of the communication system, a transfer operation in which the signal processing license is transferred from the communication system to the additional communication system such that the signal processing license is no longer maintained within the memory once the transfer operation is completely performed;
    wherein the transfer operation allows the additional communication system to perform the license-enabled signal processing function subsequent to the transfer operation and prevents the communication system from being able to perform the license-enabled signal processing function subsequent to the transfer operation.

2. The communication system of claim 1, further comprising:
    a power pack system associated with a power supply;
    an electrical interface provided by the power pack system;
    a hearing device plug-in accessory that includes the at least one physical computing component and is configured to
        communicatively and detachably couple with the power pack system by way of the electrical interface to receive operating power by which to power the at least one physical computing component from the power supply,
        communicatively and detachably couple with a hearing device separate from the communication system by way of an electrical interface provided by the hearing device separate from the communication system, and
        provide, to the hearing device separate from the communication system while the signal processing license is maintained by the communication system and the hearing device plug-in accessory is communicatively and detachably coupled with the hearing device separate from the communication system by way of the electrical interface provided by the hearing device separate from the communication system, an audio signal generated by the at least one physical computing component based on the performance of the license-enabled signal processing function on the signals received by the communication system from the one or more devices external to the communication system; and
    a hardware transceiver that is built into the hearing device plug-in accessory and is configured to receive the signals from the one or more devices external to the communication system.

3. The communication system of claim 2, wherein:
    the electrical interface provided by the power pack system and the electrical interface provided by the hearing device are both implemented as universal Europlug interfaces;
    the hearing device plug-in accessory is configured to communicatively and detachably couple with the power pack system and with the hearing device by way of the respective universal Europlug interfaces; and
    the additional communication system is implemented by an additional hearing device that lacks an electrical interface by which the hearing device plug-in accessory is configured to communicatively and detachably couple with the additional hearing device.

4. The communication system of claim 2, wherein:
    the hearing device plug-in accessory communicates with the power pack system by transmitting, by way of the electrical interface provided by the power pack system, an audio tone selected from a plurality of audio tones representative of different communications; and
    the power pack system communicates with the hearing device plug-in accessory by providing, on a conductor of the electrical interface provided by the power pack system, an impedance with respect to another conductor of the electrical interface selected from a plurality of impedances representative of different communications.

5. The communication system of claim 1, further comprising:
    a hearing device streamer accessory that includes the at least one physical computing component and is configured to communicatively couple with a hearing device separate from the communication system by way of a wireless audio interface provided by the hearing device separate from the communication system, and provide, to the hearing device separate from the communication system while the signal processing license is maintained by the communication system and the hearing device streamer accessory is communicatively coupled with the hearing device separate from the communication system by way of the wireless audio interface, a radio signal generated by the at least one physical computing component based on the performance of the license-enabled signal processing function on the signals received by the communication system from the one or more devices external to the communication system; and a hardware transceiver that is built into the hearing device streamer accessory and is configured to receive the signals from the one or more devices external to the communication system.

6. The communication system of claim 1, further comprising:

a hearing device that includes the at least one physical computing component, and lacks an electrical interface by which a hearing device plug-in accessory separate from the communication system is configured to communicatively and detachably couple with the hearing device; and a hardware transceiver that is built into the hearing device and is configured to receive the signals from the one or more devices external to the communication system.

7. The communication system of claim 1, wherein the at least one physical computing component detects that the additional communication system is within the transfer range of the communication system by:

detecting a field strength of a radio signal generated by the additional communication system; and determining, based on the detected field strength, that a received signal strength indication (RSSI) associated with the additional communication system exceeds a predetermined RSSI threshold.

8. The communication system of claim 7, wherein the transfer range of the communication system is a maximum distance from the communication system at which a wireless communication protocol by way of which the transfer operation is performed is functional to successfully perform the transfer operation.

9. The communication system of claim 7, wherein the transfer range of the communication system is a predetermined distance from the communication system that is less than a maximum distance from the communication system at which a wireless communication protocol by way of which the transfer operation is performed is functional to successfully perform the transfer operation.

10. The communication system of claim 1, wherein:

the communication system is implemented within one of a hearing device, a hearing device plug-in accessory associated with a power pack system, and a hearing device streamer accessory;

the signals received by the communication system are wireless signals associated with a digital audio transmission; and the one or more devices external to the communication system include a wireless microphone that detects an acoustic signal and transmits the digital audio transmission based on the acoustic signal.

11. The communication system of claim 1, wherein:

the at least one physical computing component determines, while the signal processing license is maintained within the memory and in response to the detection that the additional communication system is within the transfer range of the communication system, that the additional communication system does not currently maintain an additional signal processing license, and that the additional communication system is compatible with at least one of the signal processing license and the communication system; and the at least one physical computing component performs the transfer operation further in response to the determination that the additional communication system does not currently maintain the additional signal processing license and that the additional communication system is compatible with the at least one of the signal processing license and the communication system.

12. The communication system of claim 1, wherein:

the at least one physical computing component determines, while the signal processing license is maintained within the memory and in response to the detection that the additional communication system is within the transfer range of the communication system, that the communication system is in a license transfer mode; and the at least one physical computing component performs the transfer operation further in response to the determination that the communication system is in the license transfer mode.

13. The communication system of claim 1, wherein:

the at least one physical computing component further transmits, while the signal processing license is maintained within the memory and in response to the detection that the additional communication system is within the transfer range of the communication system, a license transfer request to the additional communication system; and the at least one physical computing component performs the transfer operation subsequent to the transmission of the license transfer request.

14. The communication system of claim 1, wherein:

the at least one physical computing component further receives, while the signal processing license is maintained within the memory and in response to the detection that the additional communication system is within the transfer range of the communication system, a license transfer request from the additional communication system; and the at least one physical computing component performs the transfer operation further in response to the receipt of the license transfer request.

15. The communication system of claim 1, wherein, subsequent to the transfer operation, the at least one physical computing component further:

detects, while the signal processing license is maintained by the additional communication system and not by the communication system, that the communication system is within a transfer range of the additional communication system, and performs, in response to the detection that the communication system is within the transfer range of the additional communication system, an additional transfer operation in which the signal processing license is transferred from the additional communication system to the communication system such that the signal processing license is again maintained within the memory of the communication system once the additional transfer operation is completely performed;

wherein the additional transfer operation allows the communication system to perform the license-enabled signal processing function subsequent to the additional transfer operation and prevents the additional communication system from being able to perform the license-enabled signal processing function subsequent to the additional transfer operation.

16. A communication system comprising:
   at least one physical computing device that
      maintains a signal processing license within a memory of the communication system, the signal processing license configured to allow the communication system to perform, while the signal processing license is maintained by the communication system, a license-enabled signal processing function on a digital audio transmission received by the communication system from a wireless microphone that detects an acoustic signal and transmits the digital audio transmission based on the acoustic signal,
      detects, while the signal processing license is maintained within the memory, that an additional communication system is within a transfer range of the communication system, and
      performs, in response to the detection that the additional communication system is within the transfer range of the communication system, a transfer operation in which the signal processing license is transferred from the communication system to the additional communication system such that the signal processing license is no longer maintained within the memory once the transfer operation is completely performed;
   wherein:
      the transfer operation allows the additional communication system to perform the license-enabled signal processing function subsequent to the transfer operation and prevents the communication system from being able to perform the license-enabled signal processing function subsequent to the transfer operation, and
      exactly one of the communication system and the additional communication system is configured to provide stimulation to a user to facilitate the user in perceiving the acoustic signal upon which the digital audio transmission is based.

17. The communication system of claim 16, further comprising:
   a power pack system associated with a power supply;
   an electrical interface provided by the power pack system;
   a hearing device plug-in accessory that includes the at least one physical computing component and is configured to
      communicatively and detachably couple with the power pack system by way of the electrical interface to receive operating power by which to power the at least one physical computing component from the power supply,
      communicatively and detachably couple with a hearing device separate from the communication system by way of an electrical interface provided by the hearing device separate from the communication system, and
      provide, to the hearing device separate from the communication system while the signal processing license is maintained by the communication system and the hearing device plug-in accessory is communicatively and detachably coupled with the hearing device separate from the communication system by way of the electrical interface provided by the hearing device separate from the communication system, an audio signal generated by the at least one physical computing component based on the performance of the license-enabled signal processing function on the digital audio transmission received by the communication system from the wireless microphone; and
   a hardware transceiver that is built into the hearing device plug-in accessory and is configured to receive the digital audio transmission from the wireless microphone;
   wherein the additional communication system is the exactly one of the communication system and the additional communication system that is configured to provide the stimulation to the user to facilitate the user in perceiving the acoustic signal upon which the digital audio transmission is based.

18. The communication system of claim 16, further comprising:
   a hearing device streamer accessory that includes the at least one physical computing component and is configured to
      communicatively couple with a hearing device separate from the communication system by way of a wireless audio interface provided by the hearing device separate from the communication system, and
      provide, to the hearing device separate from the communication system while the signal processing license is maintained by the communication system and the hearing device streamer accessory is communicatively coupled with the hearing device separate from the communication system by way of the wireless audio interface, a radio signal generated by the at least one physical computing component based on the performance of the license-enabled signal processing function on the digital audio transmission received by the communication system from the wireless microphone; and
   a hardware transceiver that is built into the hearing device streamer accessory and is configured to receive the digital audio transmission from the wireless microphone;
   wherein the additional communication system is the exactly one of the communication system and the additional communication system that is configured to provide the stimulation to the user to facilitate the user in perceiving the acoustic signal upon which the digital audio transmission is based.

19. The communication system of claim 16, further comprising:
   a hearing device that
      includes the at least one physical computing component, and
      lacks an electrical interface by which a hearing device plug-in accessory separate from the communication system is configured to communicatively and detachably couple with the hearing device; and
   a hardware transceiver that is built into the hearing device and is configured to receive the digital audio transmission from the wireless microphone;
   wherein the communication system is the exactly one of the communication system and the additional communication system that is configured to provide the stimulation to the user to facilitate the user in perceiving the acoustic signal upon which the digital audio transmission is based.

20. A method comprising:

maintaining, by a communication system within a memory of the communication system, a signal processing license configured to allow the communication system to perform, while the signal processing license is maintained by the communication system, a license-enabled signal processing function on signals received by the communication system from one or more devices external to the communication system;

detecting, by the communication system while the signal processing license is maintained within the memory, that an additional communication system is within a transfer range of the communication system; and performing, by the communication system in response to the detecting that the additional communication system is within the transfer range of the communication system, a transfer operation in which the signal processing license is transferred from the communication system to the additional communication system such that the signal processing license is no longer maintained within the memory once the transfer operation is completely performed;

wherein the transfer operation allows the additional communication system to perform the license-enabled signal processing function subsequent to the transfer operation and prevents the communication system from being able to perform the license-enabled signal processing function subsequent to the transfer operation.

* * * * *